US009075780B2

(12) United States Patent
Bonk et al.

(10) Patent No.: US 9,075,780 B2
(45) Date of Patent: Jul. 7, 2015

(54) SYSTEM AND METHOD FOR COMPARING OBJECTS IN DOCUMENT REVISIONS AND DISPLAYING COMPARISON OBJECTS

(71) Applicant: WORKIVA INC., Ames, IA (US)

(72) Inventors: John Arthur Bonk, Centennial, CO (US); Anthony Ryan Oskvarek, Centennial, CO (US); Scott Johns Bacon, Thornton, CO (US); Christopher James Lo Coco, Bozeman, MT (US); Bert Jeffrey Lutzenberger, Bozeman, MT (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 14/285,341

(22) Filed: May 22, 2014

(65) Prior Publication Data

US 2015/0095755 A1 Apr. 2, 2015

Related U.S. Application Data

(60) Provisional application No. 61/885,340, filed on Oct. 1, 2013.

(51) Int. Cl.
*G06F 17/00* (2006.01)
*G06F 17/22* (2006.01)

(52) U.S. Cl.
CPC ........ *G06F 17/2288* (2013.01); *G06F 17/2211* (2013.01)

(58) Field of Classification Search
CPC .................. G06F 17/2211; G06F 17/2288
USPC .................. 715/200, 212, 220, 229, 243, 254
See application file for complete search history.

(56) References Cited

U.S. PATENT DOCUMENTS

| 6,912,660 | B1 | 6/2005 | Petrogiannis |
| 7,111,230 | B2 | 9/2006 | Euchner et al. |
| 8,082,277 | B1 | 12/2011 | O'Brien et al. |
| 8,132,104 | B2 * | 3/2012 | Ash et al. ...................... 715/728 |

(Continued)

OTHER PUBLICATIONS

"Adobe Acrobat 9 Digital Signatures, Changes and Improvements" Technical White Paper, Apr. 1, 2009, 15 pages, Adobe Systems Incorporated, San Jose, CA.

(Continued)

*Primary Examiner* — Stephen Hong
*Assistant Examiner* — Gregory J Vaughn
(74) *Attorney, Agent, or Firm* — Drinker Biddle & Reath LLP

(57) ABSTRACT

A document comparison system compares revisions of a document by comparing content of a first revision of an object with content of a second revision of the object to produce a comparison object in a comparison document. The system then determines a footprint of the second revision of the object, where the footprint is a dimensional length and width of the object and its position relative to a page boundary of the document. Next, the system determines whether the entire compared content fits within the footprint of the second revision of the object. If the system determines that the entire compared content fits within the footprint of the second revision of the object, the system displays the comparison object having the same footprint as the second revision of the object. If the system determines that the entire compared content does not fit within the footprint of the second revision of the object, the system then displays the comparison object in a second manner.

20 Claims, 19 Drawing Sheets

(56) References Cited

U.S. PATENT DOCUMENTS

| | | |
|---|---|---|
| 8,255,800 B2 | 8/2012 | Moore et al. |
| 8,442,920 B1 | 5/2013 | Rakowicz et al. |
| 8,583,705 B2 | 11/2013 | Foygel et al. |
| 8,587,613 B2 | 11/2013 | Wang et al. |
| 8,595,628 B2 | 11/2013 | Bayari et al. |
| 8,612,845 B2 | 12/2013 | Nelson et al. |
| 2002/0019838 A1 | 2/2002 | Petrogiannis |
| 2003/0112273 A1* | 6/2003 | Hadfield et al. ............ 345/751 |
| 2008/0177537 A1* | 7/2008 | Ash et al. .................... 704/235 |
| 2009/0307579 A1* | 12/2009 | Gelman et al. ............. 715/229 |
| 2012/0159316 A1* | 6/2012 | Ash et al. .................... 715/256 |
| 2012/0233554 A1 | 9/2012 | Vagell et al. |
| 2013/0262373 A1 | 10/2013 | Rampson |
| 2013/0283147 A1 | 10/2013 | Wong et al. |
| 2014/0032486 A1 | 1/2014 | Sharma et al. |
| 2014/0096042 A1* | 4/2014 | Travis ......................... 715/760 |
| 2014/0149857 A1* | 5/2014 | Vagell et al. ................ 715/255 |
| 2014/0203072 A1* | 7/2014 | Jackson et al. ............. 235/375 |
| 2014/0281872 A1* | 9/2014 | Glover ........................ 715/229 |

OTHER PUBLICATIONS

"Microsoft Word Track Changes", <http://www.uthsc.edu/research/research_compliance/IRB/docs/MicrosoftWordTrackChanges.pdf>, May 2010, 27 pages, The University of Tennessee Health Science Center, Memphis, TN.

* cited by examiner

FIG. 3

| | | | | | | |
|---|---|---|---|---|---|---|
| | | | ABC Presentation — 210 | | | |
| | Blackline Title | Income Statement | | | 512 | 314a |
| | May 5th, 2013 2:15 PM by John Doe | | A | B | C D | This is a comment about the table, referencing a questionable value ~~that needs to be confirmed by another commenter~~ |
| | Revision 10 / Revision 2 | 1 | | Q3 2012 | Q3 2011 | |
| | 👁 Hide Changes | 2 Revenue | | $ 54,321 | $ 54,321 | |
| | | 3 | | ~~12,345~~ | ~~12,345~~ | |
| | 1 [chart] | 4 Gross Margin | | 54,321 | 54,321 | |
| | | | | ~~12,345~~ | ~~12,345~~ | |
| | | 5 Operating Expenses | | 54,321 | 54,321 | |
| | | | | ~~12,345~~ | ~~12,345~~ | 314b |
| | | 6 DD&A | | 54,321 | 54,321 | Here's a question about Q3 income, referencing a particular status report that was received today |
| | | | | ~~12,345~~ | ~~12,345~~ | |
| | | 7 Subtotal | | 54,321 | 54,321 | |
| | | | | ~~12,345~~ | ~~12,345~~ | |
| | 2 [table] | 8 Gain on Sale of Operating Assets | | 54,321 | 54,321 | |
| | | | | ~~12,345~~ | ~~12,345~~ | |
| | | 9 Incentive compensation | | 54,321 | 54,321 | 314c |
| | | | | ~~12,345~~ | ~~12,345~~ | |
| | | 10 Operating Income | | 54,321 | 54,321 | The notes for this row get updated with each revision, with ~~outdated references deleted~~ content added regularly. |
| | | 11 | | ~~12,345~~ | ~~12,345~~ | |
| | | 12 Interest expense | | 54,321 | 54,321 | |
| | 3 | | | ~~12,345~~ | ~~12,345~~ | |
| | | 13 Certain interest rate swaps MTM | | 54,321 | 54,321 | |
| | | | | ~~12,345~~ | ~~12,345~~ | |
| | | 14 Other income | | 54,321 | 54,321 | |
| | | | | ~~12,345~~ | ~~12,345~~ | |
| | | 15 Income before taxes | | 54,321 | 54,321 | |
| | | | | ~~12,345~~ | ~~12,345~~ | |
| 226 | | 16 Income taxes | | 54,321 | 54,321 | |
| | | | | ~~12,345~~ | ~~12,345~~ | |
| | — 220 | 17 Income from cont ops | | 54,321 | 54,321 | |
| | | | | ~~12,345~~ | ~~12,345~~ | |
| | | 18 Disco ops | | 54,321 | 54,321 | |
| | | | | ~~12,345~~ | ~~12,345~~ | |
| | | 19 Net Income | | 54,321 | 54,321 | |
| | | | | ~~12,345~~ | ~~12,345~~ | |
| | | 20 | | | | |
| | | 21 EPS (Cont ops) | | 54,321 | 54,321 | |
| | | | | ~~12,345~~ | ~~12,345~~ | |
| | | 22 EPS (Disco ops) | | 54,321 | 54,321 | |
| | | | | ~~12,345~~ | ~~12,345~~ | |
| | | 23 EPS (Net Income) | | 54,321 | 54,321 | |
| | | | | ~~12,345~~ | ~~12,345~~ | |
| | | 24 EPS (Cont ops - as adj) | | 54,321 | 54,321 | |
| | | | | ~~12,345~~ | ~~12,345~~ | |
| | | 25 | | | | |
| | | 26 Diluted shares outstanding | | 54,321 | 54,321 | |
| | | | | ~~12,345~~ | ~~12,345~~ | |
| | | 27 | | | | |
| | | 28 EBITDA, as adjusted* | | 54,321 | 54,321 | |
| | | | | ~~12,345~~ | ~~12,345~~ | |

Final Revision > Changes Markup Displayed > 'Object interactivity' (Extended canvas)

1320 [Slide Name]: Changes Summary ([#] Changes)

1326

| Header 1 | Header 2 | Header 3 | Header 4 | Header 5 |
|---|---|---|---|---|
| ~~Header 0~~ | ~~Header 1~~ | ~~Header 2~~ | ~~Header 3~~ | ~~Header 4~~ |
| 1 | 7 | 12 | 17 | 22 |
| 2 | 8 | 13 | 18 | 23 |
| 3 | 9 | 14 | 19 | 24 |
| 4 | 10 | 15 | 20 | 25 |
| 6 | 11 | 16 | 21 | 26 |
| ~~7~~ | ~~12~~ | ~~17~~ | ~~22~~ | ~~27~~ |
| ~~8~~ | ~~13~~ | ~~18~~ | ~~23~~ | ~~28~~ |
| ~~9~~ | ~~14~~ | ~~19~~ | ~~24~~ | ~~29~~ |
| ~~10~~ | ~~15~~ | ~~20~~ | ~~25~~ | ~~30~~ |

FIG. 13B

SYSTEM AND METHOD FOR COMPARING OBJECTS IN DOCUMENT REVISIONS AND DISPLAYING COMPARISON OBJECTS

CROSS-REFERENCES TO RELATED APPLICATIONS

The present application claims the benefit of the filing date of U.S. Provisional Application No. 61/885,340, filed Oct. 1, 2013, the entire contents of which are incorporated by reference.

BACKGROUND

1. Field

Embodiments disclosed herein generally relate to a system and method for comparing document revisions and displaying the comparison of the document revisions, and more specifically to a system and method for comparing objects in various revisions of a document and displaying the comparison objects.

2. Related Art

Conventional document comparison applications typically compare two versions of a document to generate a comparison document showing the changes between the versions (redline/blackline). In the comparison document, various changes (e.g., insertion, deletion, movement of text) are shown using various colors (e.g., blue, red, green) and styles (e.g., underlining, strikethrough, double underlining).

The versions of the document that are compared may include various objects (e.g., text, table, chart, graph, etc.). The conventional document comparison applications typically show all mark-ups or compared content in the objects of the comparison document. Without regard to preserving an original layout of the objects (i.e., position and size relative to a page boundary) in the comparison document, the conventional document comparison applications lack the ability and flexibility to change the way mark-ups are displayed in the objects. Consequently, it is difficult for a user to see how the changes affect the layout of the comparison document.

BRIEF DESCRIPTION OF THE DRAWINGS

The above and other features and advantages of the invention will become more apparent by describing in detail exemplary embodiments thereof with reference to the attached drawings, in which:

FIG. 3 is a screen shot diagram illustrating a comparison slide in the interactive document comparison viewer of FIG. 2, according to an embodiment;

FIG. 5 is a screen shot diagram illustrating a comparison slide in the interactive document comparison viewer of FIG. 2, according to still another embodiment;

FIGS. 13A-13D are diagrams illustrating a PDF document display of a comparison document, according to an embodiment.

DETAILED DESCRIPTION OF THE EMBODIMENTS

As described herein, various embodiments relate to a system and method for comparing objects in various revisions of a document and displaying the comparison objects. A document comparison system may include a server and various client devices or may simply involve a single device or peer-to-peer devices. The document comparison system may be implemented in a cloud computing environment. In a client-server architecture, a document comparison viewer may be installed on the server, the client devices, or both. The document comparison viewer may also be an application that is accessible through a web browser. The document comparison system compares revisions of a document by comparing content of a first revision of an object with content of a second revision of the object to produce a comparison object in a comparison document. The system then determines a footprint of the second revision of the object, where the footprint is a dimensional length and width of the object and its position relative to a page boundary of the document. Next, the system determines whether the entire compared content fits within the footprint of the second revision of the object. If the system determines that the entire compared content fits within the footprint of the second revision of the object, the system displays the comparison object having the same footprint as the second revision of the object. If the system determines that the entire compared content does not fit within the footprint of the second revision of the object, the system then displays the comparison object in a second manner.

Figure 1:
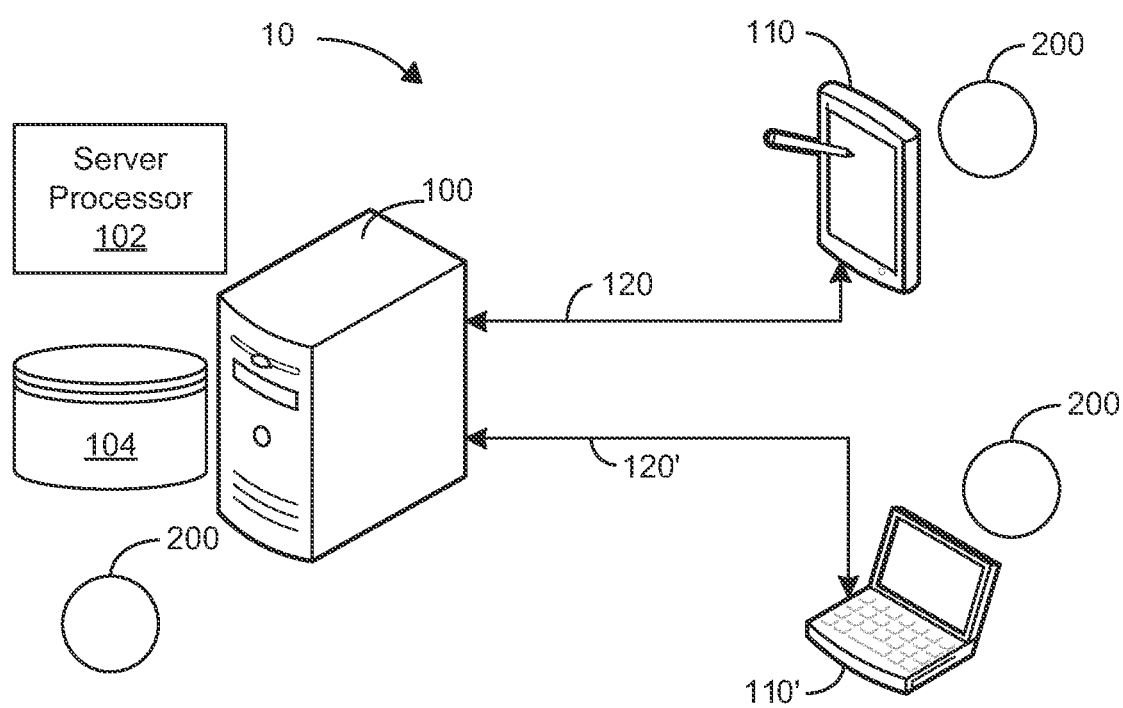
FIG. 1 is a pictorial diagram illustrating a document comparison system, according to an embodiment.

FIG. 1 is a pictorial diagram illustrating a document comparison system 10, according to an embodiment. The document comparison system 10 may be implemented in a cloud computing environment. In the present embodiment, the document comparison system 10 includes a server 100 (or a cloud) and client devices 110 and 110'. The server 100 may include a server processor 102 and a server memory 104 (e.g., server database, application database, etc.). Although FIG. 1 shows that the server 100 includes one processor 102 and one memory 104, in other embodiments, the server 100 may include any number of processors and/or memories.

The first client device 110 and the second client device 110' are connected to the server 100 via first communication link 120 and second communication link 120', respectively. The first and second communication links 120 and 120' may include, for example, Internet, LAN, WLAN, Wi-Fi, 3G networks, 4G networks, or other telecommunication networks known in the art. Although FIG. 1 shows two client devices, any number of client devices may be connected to the server 100 and associated with the system 10. A client device may include a tablet PC, a mobile phone, a smart phone, a laptop, a computer terminal, and any other client devices known in the art. Each of the first 110 and second 110' client devices includes a client processor, a client memory, a client display unit, and a client input unit. The client display unit may be, for example, a liquid crystal display (LCD), a LED-LCD, or other displays known in the art. The client input unit may be, for instance, a touch screen, a stylus, a keypad, a keyboard, a mouse, or other input devices known in the art.

The document comparison system 10 also includes a document comparison viewer 200. The document comparison viewer 200 is an application that may be installed on the server 100 (or available via the cloud) and/or the first 110 and second 110' client devices, so that the document comparison viewer 200 may be executed by the server 100, by the first 110 and second 110' client devices, or by a combination of the server 100 and the client devices. In an embodiment, the document comparison viewer 200 is an application that is accessible through a web browser. In addition, the document comparison viewer 200 may be implemented in an interactive viewer or a static viewer (e.g., in the form of a PDF document).

Figure 2:
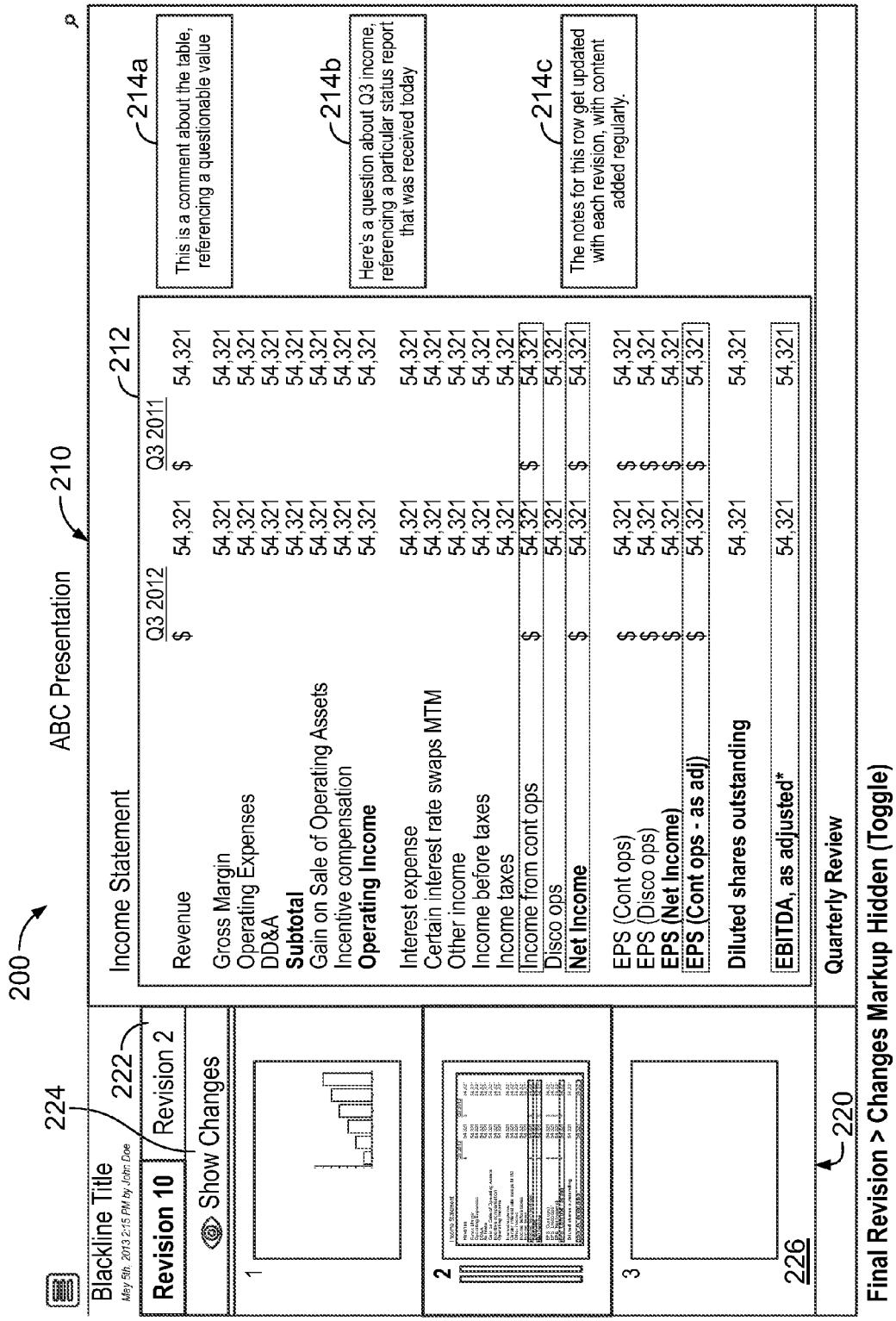
FIG. 2 is a screen shot diagram illustrating a revision of a slide in an interactive document comparison viewer, according to an embodiment.

FIG. 2 is a screen shot diagram illustrating a revision of a slide in an interactive document comparison viewer 200, according to an embodiment. The document comparison viewer 200 includes a document display and a navigation bar 220. In the current embodiment, the document display is a slide display 210, since the current document is a presentation including multiple slides.

The slide display 210 displays a currently selected slide, which may include various objects. The slide shown in FIG. 2 includes four objects: a table object 212, a first text object 214a, a second text object 214b, and a third text object 214c. Although not shown, the slide may also include other type of objects, for example, image objects, graph objects, fixed text objects, etc. Each object has a footprint, which is defined as a dimensional length and width of the object. For example, a footprint of an object may be a bounding box of the object, regardless of the actual shape of the object.

The navigation bar 220 includes various selectors, which allows a user to control the document comparison viewer 200. As shown in FIG. 2, the navigator bar 220 includes a document revision selector 222, a comparison display selector 224, and a page selector or slide selector 226. The document revision selector 222 allows a user to toggle between various revisions of a document. In the current embodiment, the document revision selector 222 allows toggling between revision 2 and revision 10 of the presentation. The comparison display selector 224 allows a user to toggle between a clean version and a mark-up version of a document. In FIG. 2, the clean version of revision 10 of the presentation is shown, as the mark-ups on the currently displayed slide are hidden from view. The slide selector 226 offers the user a preview of other slides in the presentation, indicates which slides include mark-ups, and allows the user to quickly select the desired slide from the presentation.

Figure 3:
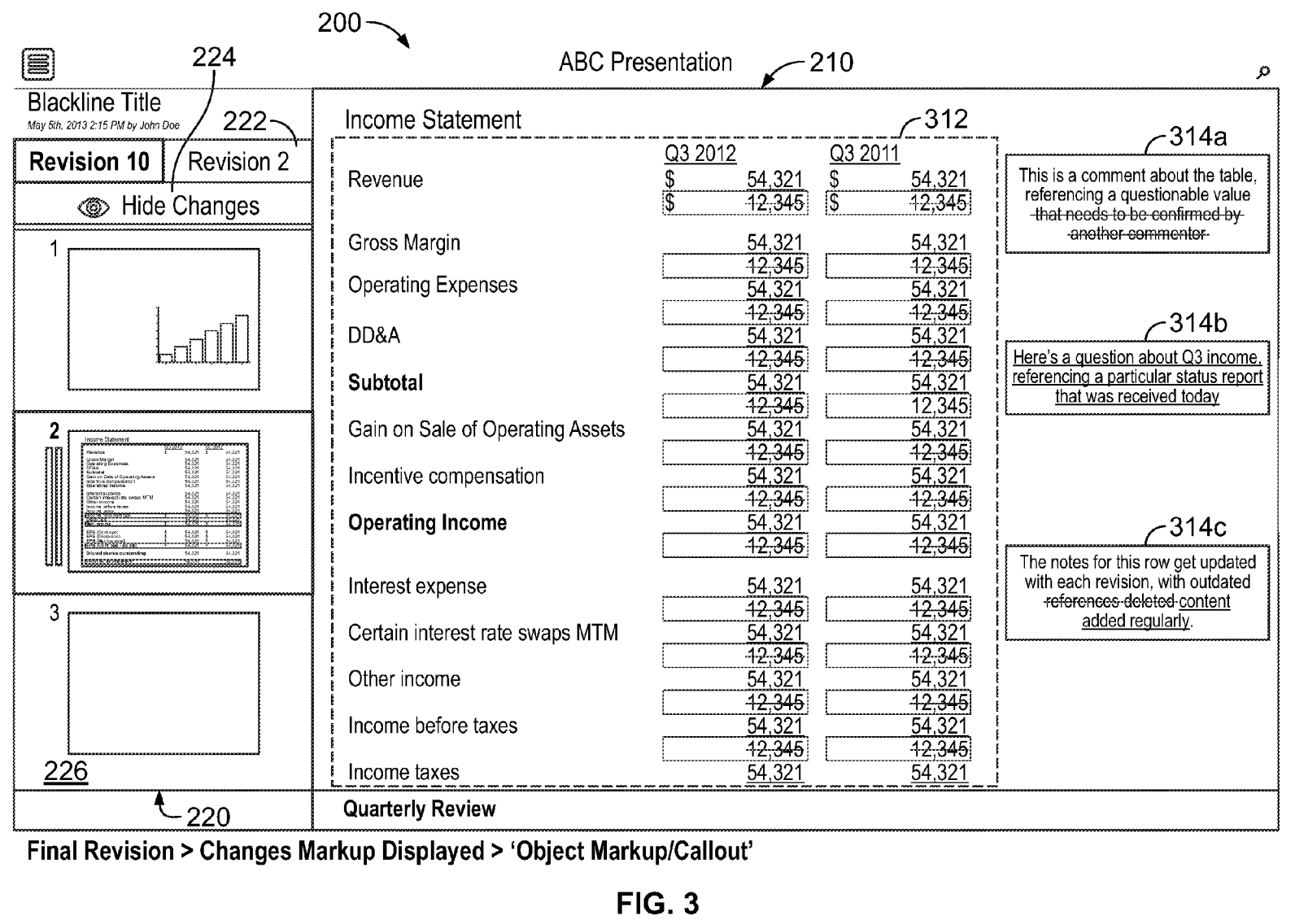

FIG. 3 is a screen shot diagram illustrating a comparison slide in the interactive document comparison viewer 200 of FIG. 2, according to an embodiment. As shown in FIG. 3, the comparison display selector 224 has been toggled so that a comparison slide is displayed in the slide display 210. The slide display 210 now displays a table comparison object 312, a first text comparison object 314a, a second text comparison object 314b, and a third text comparison object 314c. Although FIG. 3 illustrates that all the objects in the slide includes mark-ups, in other embodiments, only some of the objects may include mark-ups while other objects remain unchanged (i.e., no mark-ups or clean).

In FIG. 3, the table comparison object 312 has the same footprint as the table object 212 shown in FIG. 2. Due to the mark-ups, not all the content of the table comparison object 312 (compared content) are shown because the entire compared content does not fit within the footprint of the table object 212. On the other hand, the first text comparison object 314a, the second text comparison object 314b, and the third text comparison object 314c have different footprints from the footprints of the first text object 214a, the second text object 214b, and the third text object 214c. For instance, the footprint of the first text comparison object 314a is larger than the footprint of the text object 214a so that the entire compared content of the first text comparison object 314a is displayed. In other embodiments, the first 314a, second 314b, and third 314c text comparison objects may retain the same footprint as the first 214a, second 214b, and third 214c text objects.

In various embodiments, a default display of a comparison document may be customized by a user. For instance, as described above, the comparison objects may retain the same footprint as the clean version of the objects. Optionally, the default display could be set to fully expand the footprints of all objects to display all mark-ups (e.g., the sizes and positions of the comparison objects may change to accommodate the display of all mark-ups), fully expand the footprint of one comparison object while retaining original footprint of other objects, or always expand footprint of a type of object (e.g., always expand the footprint of a text comparison object).

Figure 4:
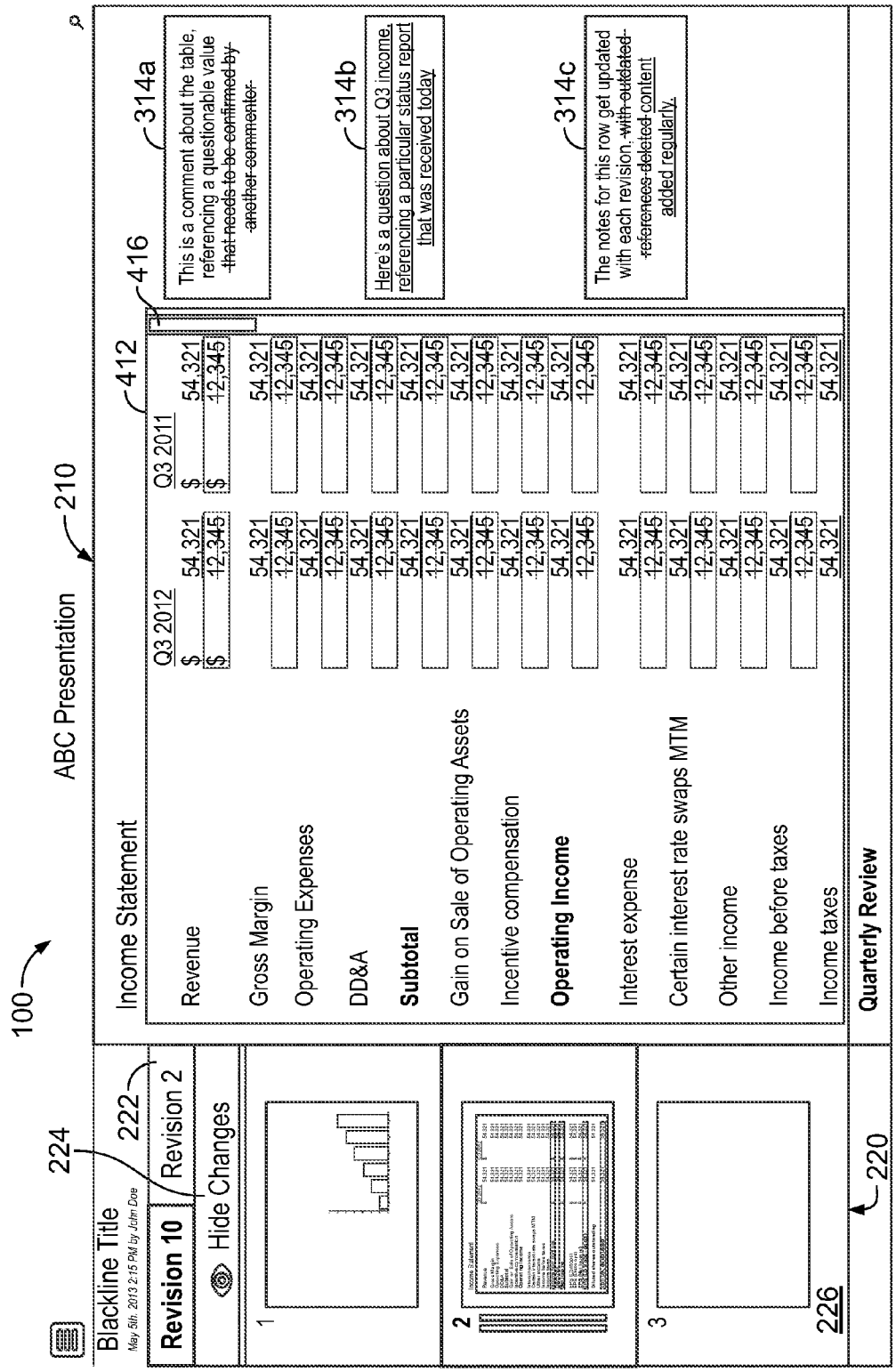
FIG. 4 is a screen shot diagram illustrating a comparison slide in the interactive document comparison viewer of FIG. 2, according to another embodiment.

FIG. 4 is a screen shot diagram illustrating a comparison slide in the interactive document comparison viewer 200 of FIG. 2, according to another embodiment. In FIG. 4, the slide display 210 displays a table comparison object 412, the first text comparison object 314a, the second text comparison object 314b, and the third text comparison object 314c. Here, the user may selectively focus on a particular comparison object shown in the slide display 210, e.g., the table comparison object 412. When the table comparison object 412 is selected (e.g., by single-clicking on the table comparison object 412), the other objects in the comparison slide (e.g., the first 314a, the second 314b, and the third 314c text comparison objects) are unselected, e.g., grayed-out.

Like the table comparison object 312 in FIG. 3, the table comparison object 412 also has the same footprint as the table object 212 shown in FIG. 2. Thus, the entire compared content of the table comparison object 412 is not shown because the entire compared content does not fit within the footprint of the table object 212. To facilitate the viewing of the entire compared content of the table comparison object 412, the document comparison viewer 200 adds a scroll bar 416 to the table comparison object 412. In turn, the user may use the scroll bar 416, which is displayed adjacent to or overlapping the table comparison object 412, to scroll through the entire compared content of the table comparison object 412. Although FIG. 4 illustrates a vertical scroll bar 416, a horizontal scroll bar may be generated in another embodiment. In yet other embodiments, both a vertical scroll bar and a horizontal scroll bar may be generated based on the compared content in the comparison object.

The scroll bar 416 may serve both notification and functional purposes. For instance, before the table comparison object 412 is selected, the scroll bar 416 may be displayed to notify a user that there is more compared content available than what is shown in the footprint of the table comparison object 412. Once the table comparison object 412 is selected, the scroll bar 416 becomes functional so that the user may use it to scroll through the entire compared content of the table comparison object 412. In other embodiments, the scroll bar 416 may be functional once it is generated, i.e., before the table comparison object 412 is selected.

FIG. 5 is a screen shot diagram illustrating a comparison slide in the interactive document comparison viewer 200 of FIG. 2, according to still another embodiment. In FIG. 5, the slide display 210 displays a table comparison object 512, the first text comparison object 314a, the second text comparison object 314b, and the third text comparison object 314c. Similar to FIG. 4, because the table comparison object 512 is selected (e.g., by double-clicking the table comparison object 312), the other objects in the comparison slide (e.g., the first 314a, the second 314b, and the third 314c text comparison objects) are unselected, e.g., grayed-out.

As shown in FIG. 5, the table comparison object 512 has a different footprint than the table object 212 shown in FIG. 2. When a user double-clicks on the table comparison object 312 as shown in FIG. 3, the document comparison viewer 200 generates the table comparison object 512 so that the entire compared content is shown. The document comparison viewer 200 may expand the footprint of the table comparison object 512 lengthwise, widthwise, or both. Furthermore, the footprint of the table comparison object 512 may be expanded beyond the boundary of the slide or page. In other embodiments, the footprint of the table comparison object 512 may be expanded to overlap other objects or to be full-screen. In yet other embodiments, the table comparison object 512 may be rendered as an independent, non-connected object from the rest of the slide (i.e., a pop-out view of table comparison object 512).

Figure 6:
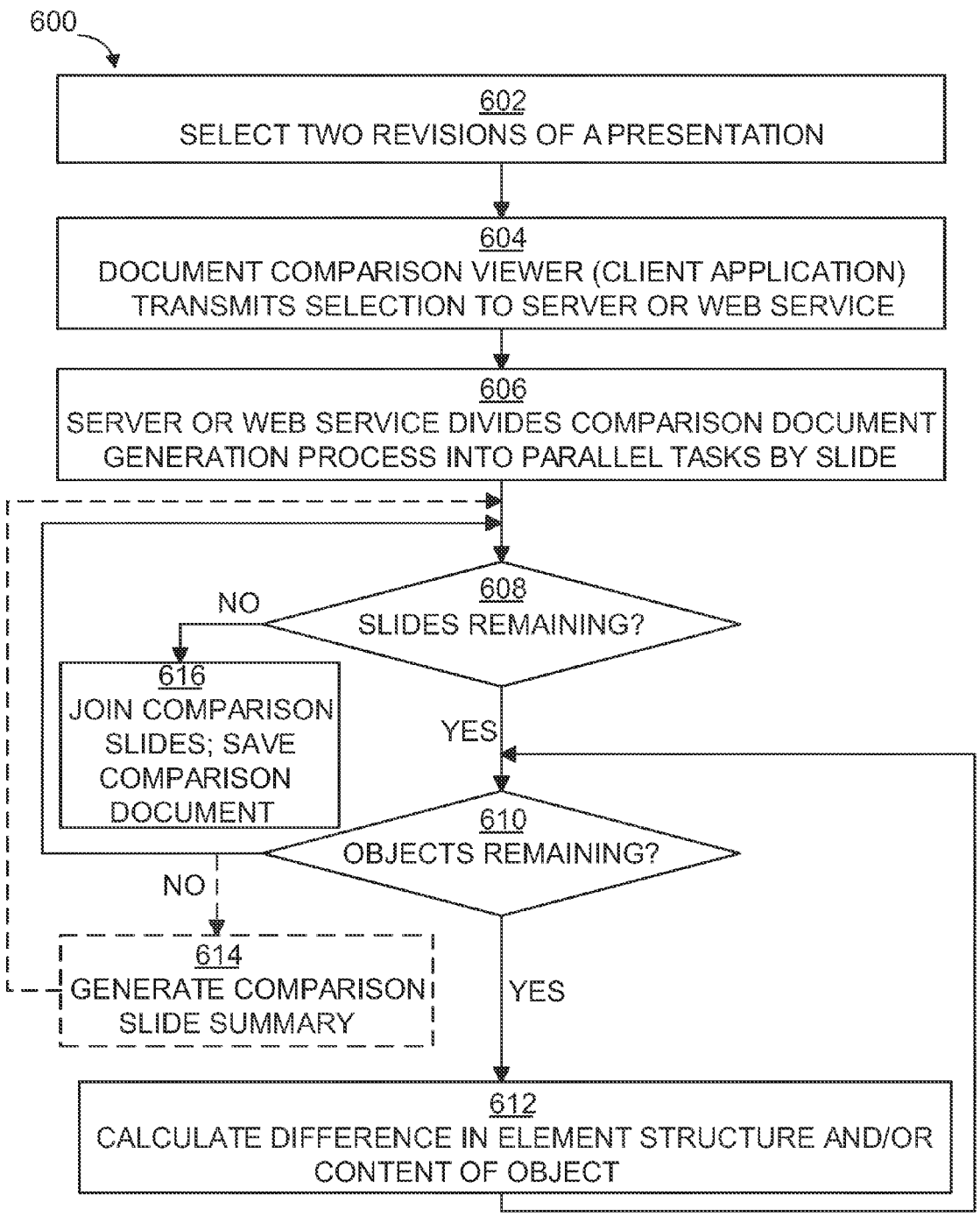
FIG. 6 is a flowchart illustrating a method of comparing revisions of a document, according to an embodiment.

FIG. 6 is a flowchart illustrating a method of comparing revisions of a document, according to an embodiment. At step 602, two revisions of a document (e.g., a presentation) are selected for comparison by a user using the document comparison viewer on a client device. At step 604, the client device transmits the document revisions selection to a server or web service (e.g., cloud). After receiving the document revisions selections, at step 606, the server or web service divides comparison document generation process into parallel tasks by slide. In other words, the server or web service may generate the comparison document through parallel processing, e.g., generate and render multiple comparison slides at the same time. In other embodiments, the server or web service may generate the comparison document one slide at a time, e.g., generate and render the comparison slides serially. The server or web service first determines the matching slides in the document revisions and then determines the matching objects in each matching slide. While the current embodiment is directed to presentation slides, this method can be used for other types of documents in other embodiments. For example, the server or web service may first determine the matching sections or pages in the document revisions and then determine the matching objects in each matching section or page.

The comparison document generation process is now discussed in detail. At step 608, the document comparison system 10 determines whether any slides remain to be compared. If there are no slides remaining (NO of step 608), the compared slides are joined to form one comparison document at step 616, and the comparison document containing the compared slides is saved. If there are slides remaining to be compared (YES of step 608), then at step 610, the document comparison system 10 determines whether there are any objects within the remaining slides that need to be compared. If no object remains on a slide to be compared (NO of step 610), the method returns to step 608 to determine whether there are any additional slides remaining. If there are objects remaining to be compared (YES of step 610), the document comparison system 10 compares the objects in the different revisions to calculate the different element structure and/or content of the objects in step 612.

Optionally, if no object remains on a slide to be compared (NO of step 610), the document comparison system 10 may generates a comparison slide summary in step 614 before returning to step 608. A comparison slide summary is a summary of the changes or mark-ups for a slide. In the current embodiment, a comparison slide summary is generated after each slide is compared. In other embodiments, however, a comparison slide summary for the entire document may be generated after step 612. The comparison slide summary may be generated in the interactive document comparison viewer or in the PDF document comparison viewer.

Figure 7A:
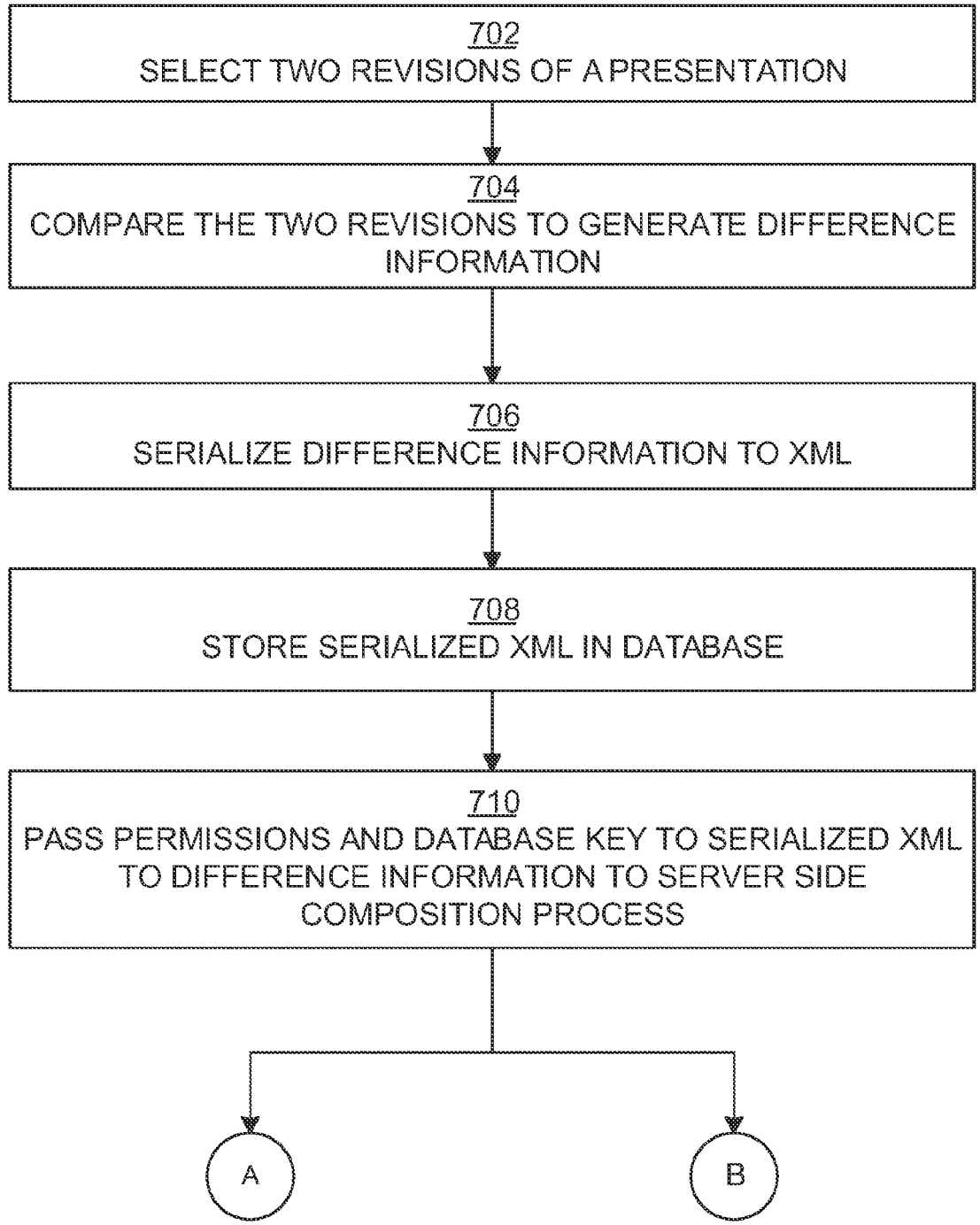
FIG. 7A is a flowchart illustrating a method of comparing revisions of a document, according to an embodiment.

FIG. 7A is a flowchart illustrating a method of comparing revisions of a document, according to an embodiment. At step 702, two revisions of a presentation are selected. At step 704, the two revisions are compared to generate difference information. Then at step 706, the difference information of the two revisions is serialized into XML. The serialized XML difference information is then stored in a database, such as memory 104 of server 100, at step 708. Then, the permissions and database key to the serialized XML difference information are passed to the Server Side Composition process. The Server Side Composition process is a method for storing a document in document content sections. (For a more detailed discussion of the Server Side Composition process, see U.S. Pat. No. 8,504,827 entitled "DOCUMENT SERVER AND CLIENT DEVICE DOCUMENT VIEWER AND EDITOR" issued on Aug. 6, 2013, which is hereby incorporated herein by reference in its entirety.) After comparing the document revisions and generating the difference information, the document comparison system 10 may display the comparison document in a static document comparison viewer such as a PDF document display (A), or in an interactive document comparison viewer (B), both of which will be discussed in detail below.

Figure 7B:
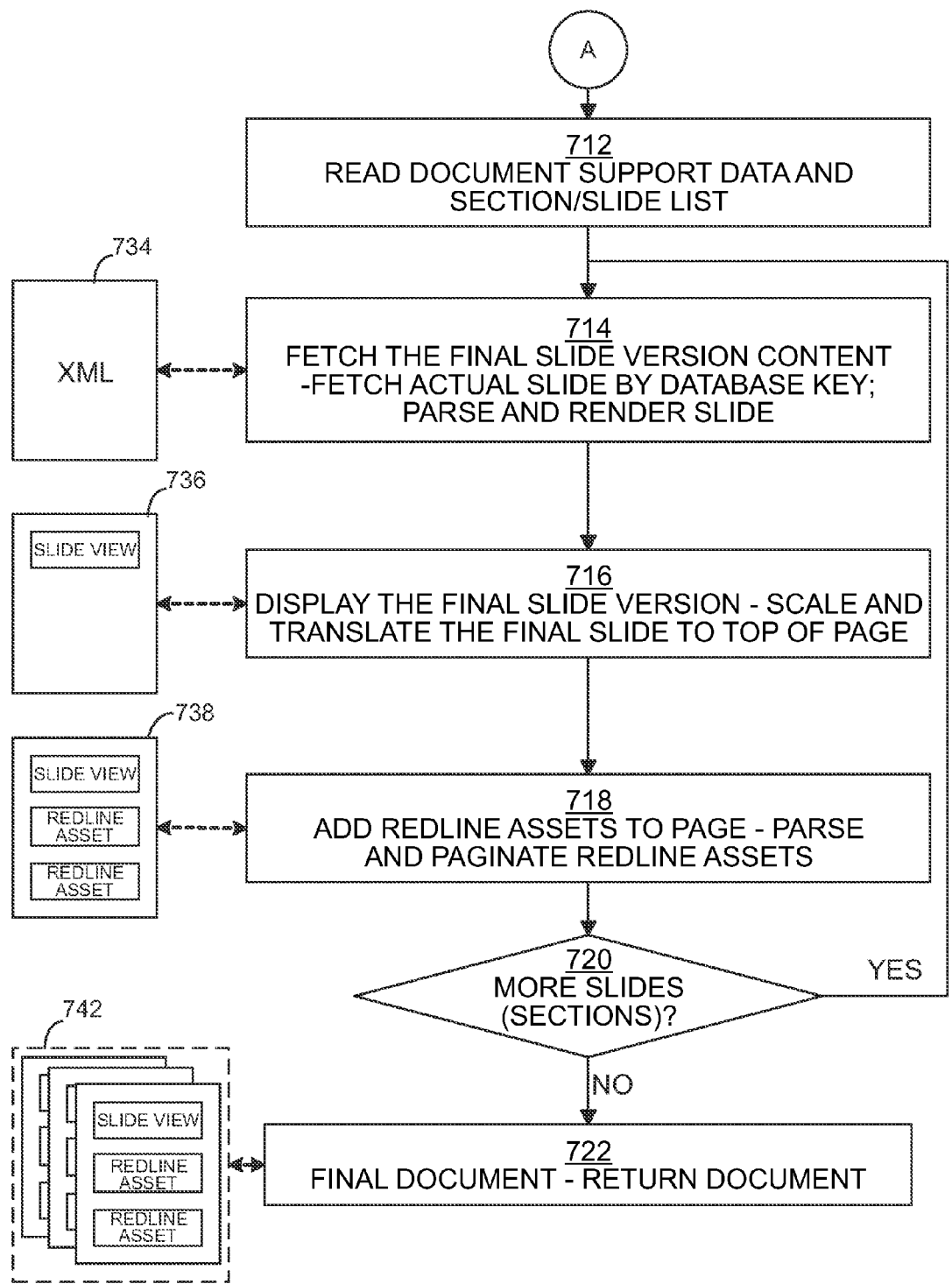
FIG. 7B is a flowchart illustrating a method of generating a PDF document display of the comparison of the document revisions of FIG. 7A, according to an embodiment.

FIG. 7B is a flowchart illustrating a method of generating a PDF document display of the comparison of the document revisions of FIG. 7A, according to an embodiment. At step 712, the document comparison system 10 reads the document support data (i.e., metadata that includes pagination data, formatting data, style data, etc.) and a section or slide list. The document comparison system 10 may process the slides in the slide list in parallel, or, the document comparison system 10 may process the slides in the slide list serially. At step 714, the document comparison system 10 fetches the content of the final slide version (e.g., second revision) by fetching the actual slide by database key (e.g., final slide XML 734). Then the document comparison system 10 parses and renders the final slide version in a PDF format. At step 716, the final slide version is scaled, translated, and shown on the top of a PDF display page, as shown in PDF slide view 736. At step 718, the redline assets of the comparison document are added to the PDF display page. Redline assets may include, e.g., text flow, graphs, images, and tables. The redline assets are parsed and paginated to be displayed below the PDF slide view, as shown in the PDF page view 738. At step 720, the document comparison system 10 determines whether more slides remain to be processed from the section/slide list. If no slide or section remains to be processed (NO of step 720), the final PDF document 742, which may include multiple PDF page views 738, is generated. The final PDF document 742 may then be returned to the client for the user's review at step 722. If more sections or slides remain to be processed (YES of step 720), the process then returns to step 714, where the final slide version content for the remaining slides are fetched.

Figure 7C:
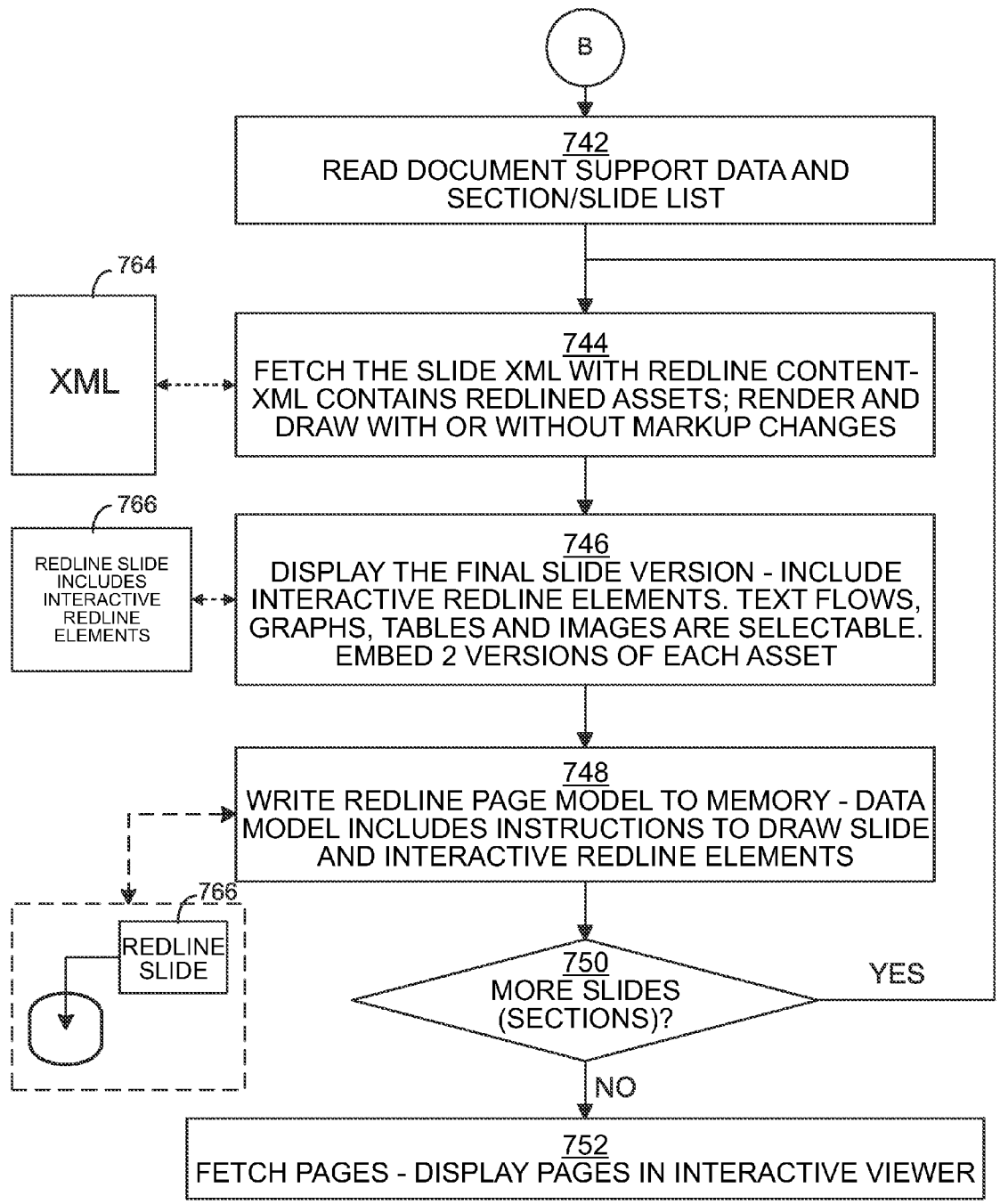
FIG. 7C is a flowchart illustrating a method of generating an interactive display of the comparison of the document revisions of FIG. 7A, according to an embodiment.

FIG. 7C is a flowchart illustrating a method of generating an interactive display of the comparison of the document revisions of FIG. 7A, according to an embodiment. At step 742, the document comparison system 10 reads the document support data and section/slide list. The document comparison system 10 may process the slides in the slide list in parallel or serially. At step 744, the document comparison system 10 fetches the slide XML with the redline content, i.e., comparison slide XML 764. Using the comparison slide XML 764, the document comparison system 10 can render and draw a comparison slide with or without the mark-ups. At step 746, the redline slide 766 is shown in the interactive document comparison viewer. The interactive document comparison viewer may be a stand-alone application or may be an application accessible through a web browser. The redline slide 766 includes interactive redline elements, and text flows, graphs, tables, and images are selectable within the redline slide 766. Furthermore, in the redline slide 766, two versions of each redline asset are embedded (e.g., first revision and second revision of the asset to enable toggling between the two revisions). At step 748, the document comparison system 10 stores the redline slide 766 and its data model into a database, e.g., memory 104. The data model of the redline slide 766 includes instructions to draw the slide and its interactive redline elements. At step 750, the document comparison system 10 determines whether more sections or slides remain to be processed from the section/slide list. If no slide or section remains to be processed (NO of step 750), the redline slide 766 is fetched and displayed in the interactive viewer (e.g., web browser or stand-alone application). If more sections or slides remain to be processed (YES of step 750), the process then returns to step 744, where the next comparison slide XML is fetched and rendered.

Although the document comparison system 10 performs the document comparison and comparison display using XML, the system can easily compare other types of documents. The document comparison system 10 may convert any document (e.g., a word processing document, a spreadsheet, a presentation, etc.) into XML so that comparison may be performed. Furthermore, the document comparison system 10 may convert each revision of a document and its embedded and/or linked objects into XML.

Figure 8:
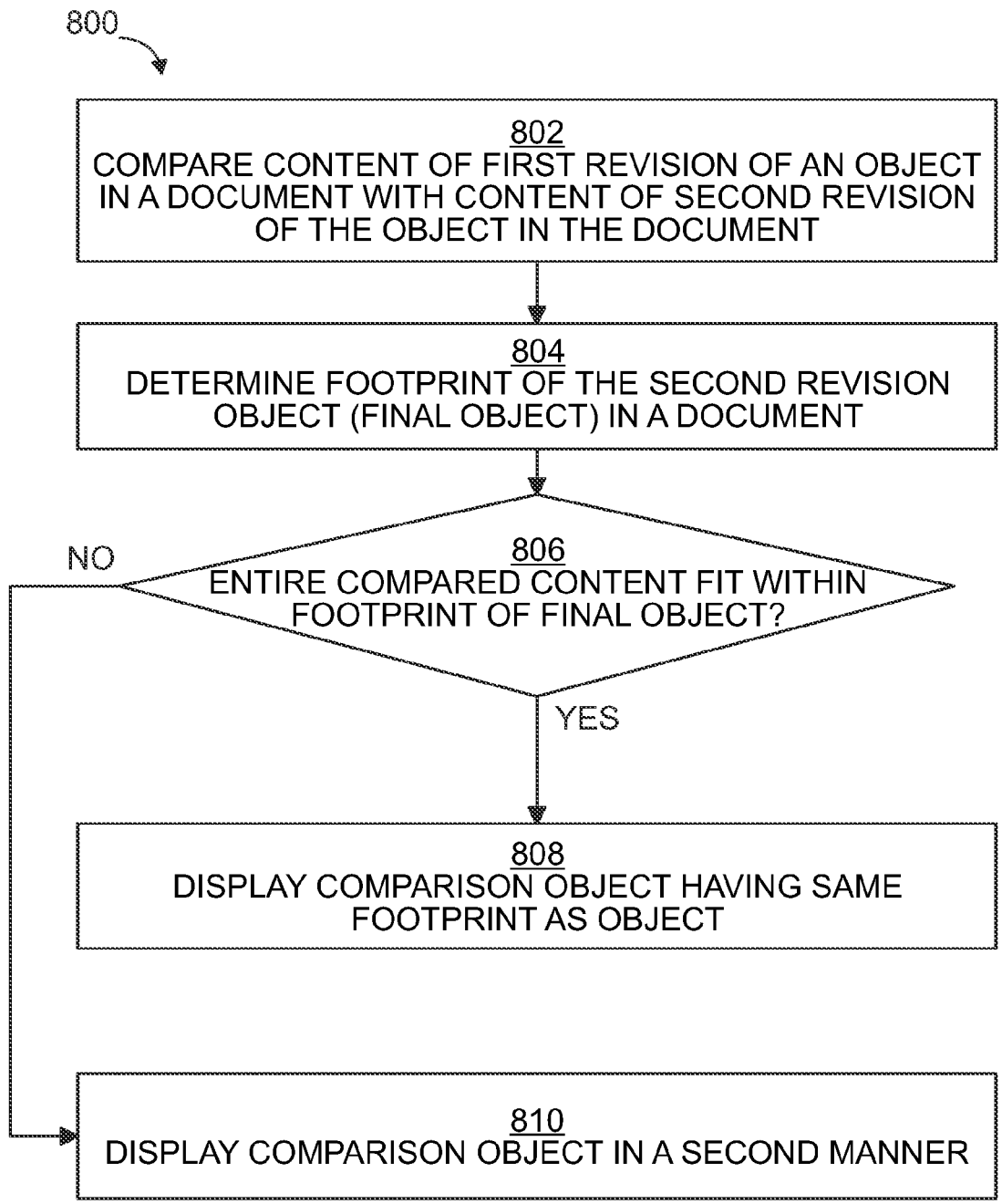
FIG. 8 is a flowchart illustrating a method of comparing revisions of a document and displaying the comparison of the document revisions, according to an embodiment.

FIG. 8 is a flowchart illustrating a method 800 of comparing revisions of a document and displaying the comparison, according to an embodiment. At step 802, the document comparison system 10 compares content of a first revision of the object with content of a second revision of the object to produce a comparison object (e.g., table comparison object 312 as shown in FIG. 3) in a comparison document. At step 804, the document comparison system 10 determines a footprint of the second revision of the object or the final object (e.g., table object 212 as shown in FIG. 2), where the footprint is a dimensional length and width of the object. The document comparison system 10 may perform the document comparison on the server 100 or on the first 110 and second 110' client devices, depending on where the document is stored, the processing power of the client devices, and whether the client devices are in communication with the server.

Next, at step 806, the document comparison system 10 determines whether the entire compared content (e.g., the entire compared content of the table comparison object 312) fits within the footprint of the final object (e.g., table object 212). If the document comparison system 10 determines that the entire compared content fits within the footprint of the final object (YES of step 806), the document comparison system 10 then displays the comparison object in the same footprint as the final object at step 808. On the other hand, if the document comparison system 10 determines that the entire compared content does not fit within the footprint of the final object (NO of step 806), the document comparison system 10 then displays the comparison object in a second manner in step 810, which will be discussed in more detail below with respect to FIG. 9 and FIG. 10.

Figure 9:
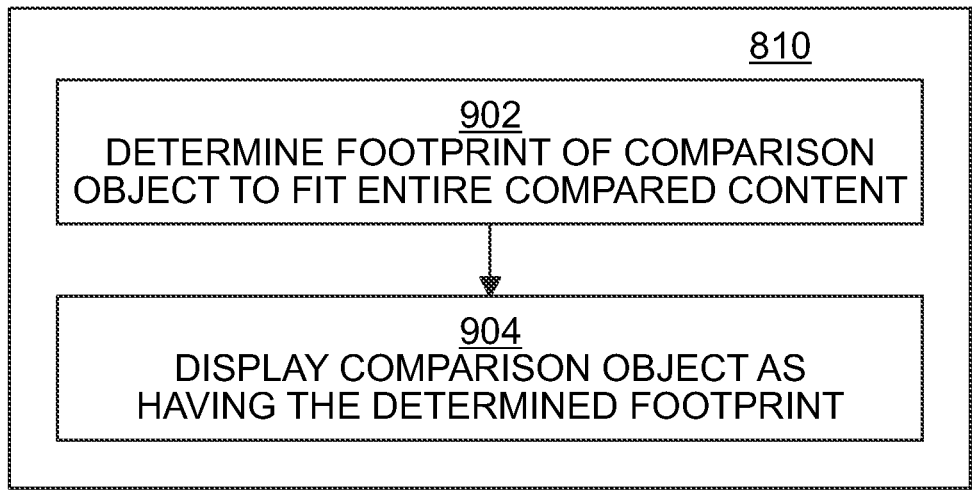
FIG. 9 is a flowchart illustrating a method of displaying a comparison object in a second manner, according to an embodiment.

FIG. 9 is a flowchart illustrating a method of displaying a comparison object in a second manner (step 810 of FIG. 8), according to an embodiment. After the document comparison system 10 determines that the entire compared content does not fit within the footprint of the final object at step 806, the document comparison system 10 determines a footprint of the comparison object that will fit the entire compared content (e.g., table comparison object 512 of FIG. 5) at step 902. Then at step 904, the document comparison system 10 displays the comparison object as having the determined footprint. For example, the footprint of the comparison object may extend beyond the boundary of the document page and/or overlap other objects. In another embodiment, the comparison object may be displayed in full screen. In yet other embodiments, the document comparison system 10 may render the comparison object as an independent, non-connected object from the rest of the comparison document (i.e., the comparison object is popped-out of the comparison document page).

Figure 10:
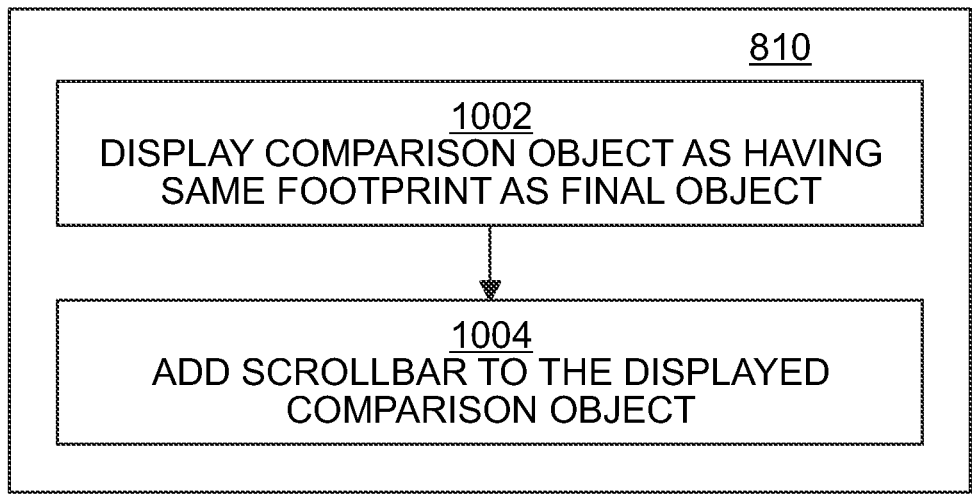
FIG. 10 is a flowchart illustrating another method of displaying a comparison object in a second manner, according to an embodiment.

FIG. 10 is a flowchart illustrating another method of displaying a comparison object in a second manner (step 810 of FIG. 8), according to an embodiment. After the document comparison system 10 determines that the entire compared content does not fit within the footprint of the final object at step 806, the document comparison system 10 displays the comparison object (e.g., the table comparison object 412 of FIG. 4) as having the same footprint as the final object (e.g., table object 212) at step 1002. To facilitate viewing of the compared content, at step 1004, the document comparison system 10 adds a scroll bar (e.g., the scroll bar 416 of FIG. 4) to the displayed comparison object. The scroll bar may be vertical or horizontal depending on the amount of compared content in the comparison object. In an embodiment, both a vertical scroll bar and a horizontal scroll may be generated and displayed.

Figure 11A:
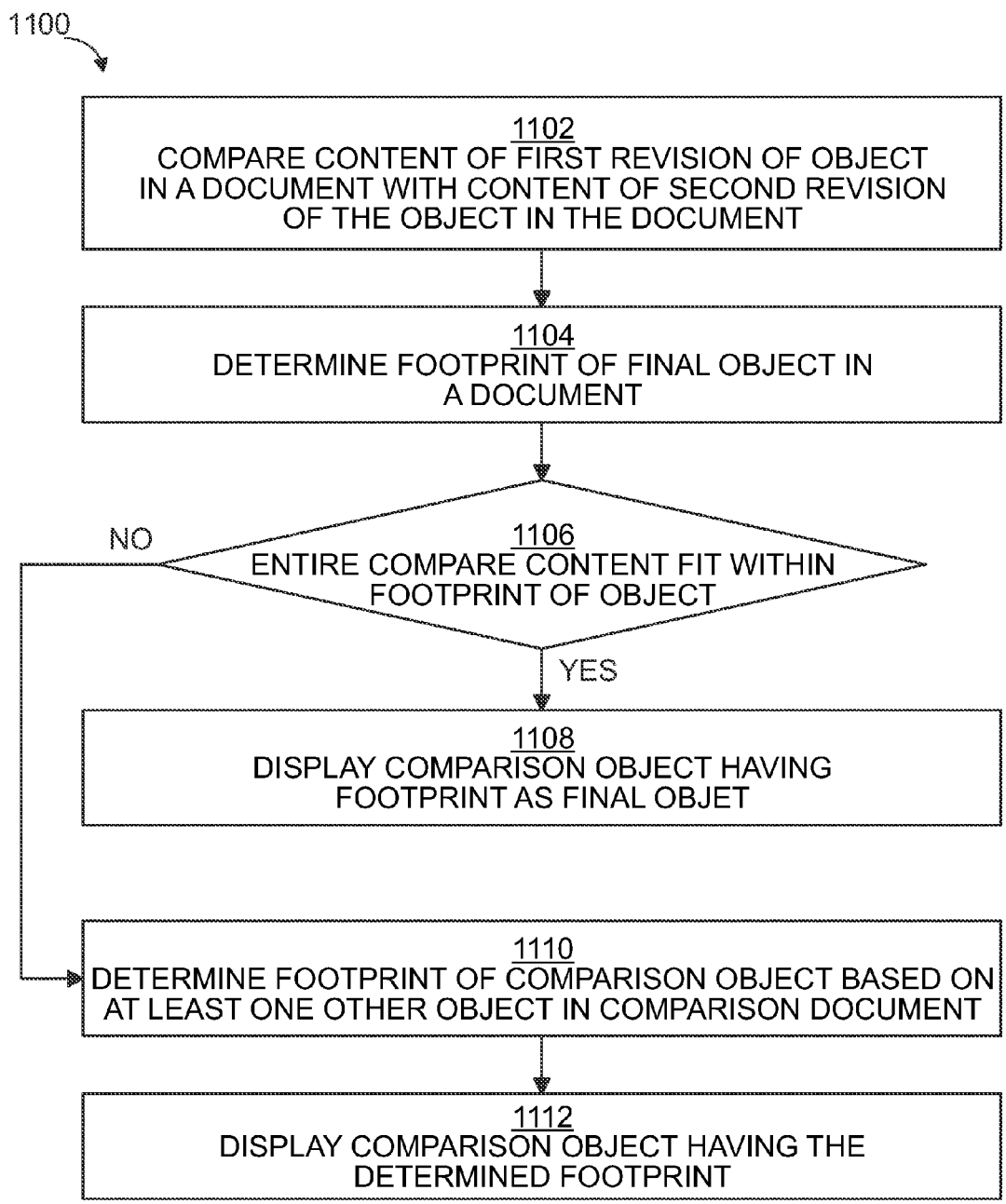
FIG. 11A is a flowchart illustrating a method of displaying a comparison object based on at least one other object in a comparison document, according to an embodiment.

FIG. 11A is a flowchart illustrating a method 1100 of displaying a comparison object based on at least one other object in a comparison document, according to an embodiment. At step 1102, the document comparison system 10 compares content of a first revision of the object with content of a second revision of the object to produce a comparison object (e.g., table comparison object 312 as shown in FIG. 3) in a comparison document. At step 1104, the document comparison system 10 determines a footprint of the final object in a document (e.g., table object 212 as shown in FIG. 2). At step 1106, the document comparison system 10 determines whether the entire compared content (e.g., the entire compared contents of the table comparison object 312) fits within the footprint of the final object (e.g., table object 212). If the document comparison system 10 determines that the entire compared content fits within the footprint of the final object (YES of step 1106), the document comparison system 10 then displays the comparison object in the same footprint as the final object at step 1108. On the other hand, if the document comparison system 10 determines that the entire compared content does not fit within the footprint of the final object (NO of step 1106), the document comparison system 10 then determines a footprint of the comparison object based on at least one other object in the comparison document (e.g., first text comparison object 314*a*) at step 1110. The document comparison system 10 then displays the comparison object as having the determined footprint at step 1112.

Figure 11B:
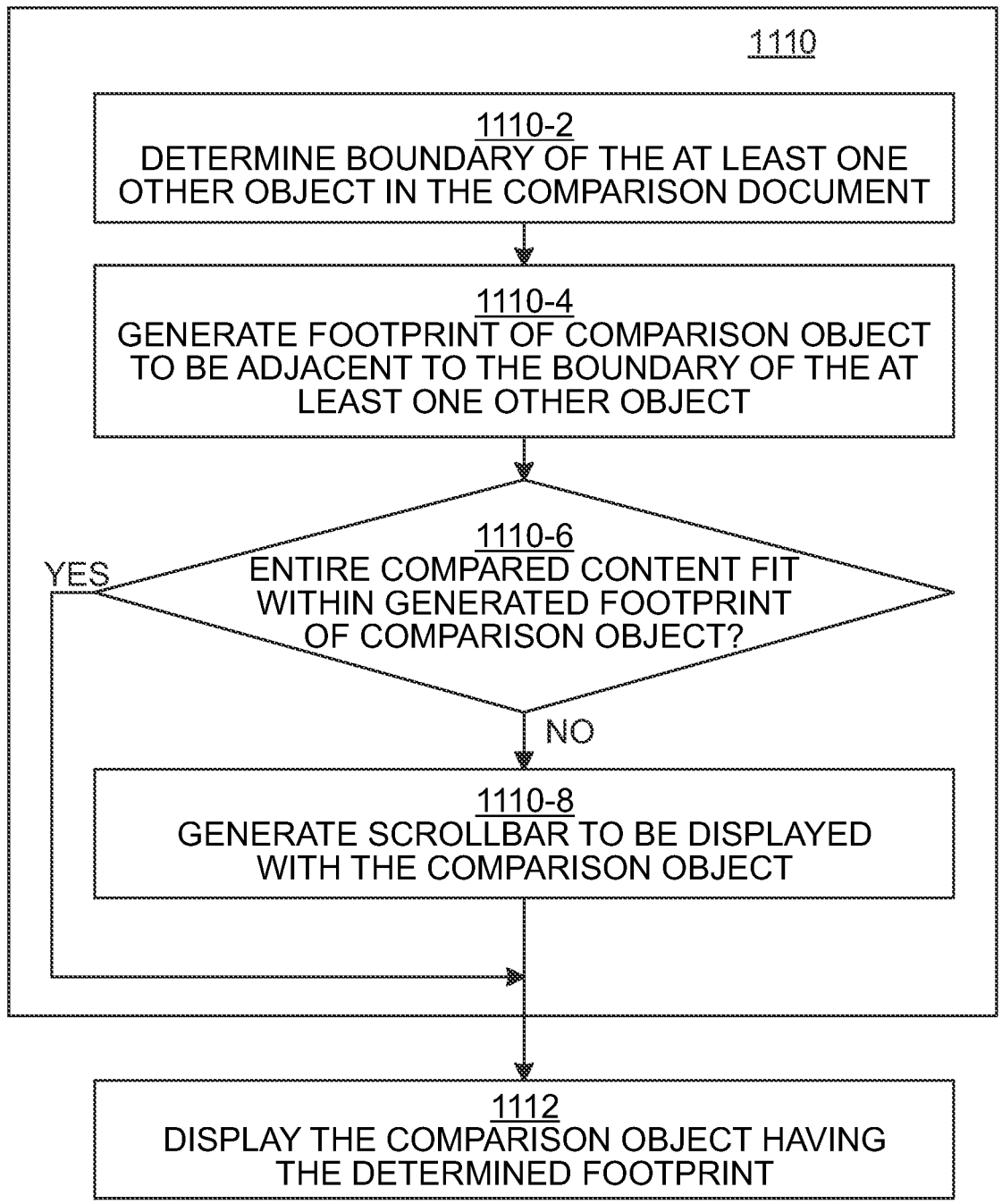
FIG. 11B is a flowchart illustrating a method of generating a footprint of a comparison object based on at least one other object in a comparison document, according to an embodiment.

FIG. 11B is a flowchart illustrating a method of generating a footprint of a comparison object based on at least one other object in a comparison document (step 1110 of FIG. 11A), according to an embodiment. At step 1110-2, the document comparison system 10 determines a boundary of the at least one other object in the comparison document (e.g., a boundary of the first text comparison object 314*a*). Based on the boundary of the at least one other object, the document comparison system 10 generates the footprint of the comparison object to be adjacent to the boundary of the at least one other object at step 1110-4. Then at step 1110-6, the document comparison system 10 determines whether the entire compared content fits within the generated footprint of the comparison object. If the entire compared content does fit within the generated footprint of the comparison object (YES of step 1110-6), the document comparison system 10 then displays the comparison object as having the generated footprint in step 1112. If the entire compared content does not fit within the generate footprint (NO of step 1110-6), then at step 1110-8, the document system 10 generates a scroll bar to be displayed with the comparison object. The document system 10 then displays the comparison object as having the generated footprint and the scroll bar in step 1112.

Figure 12A:
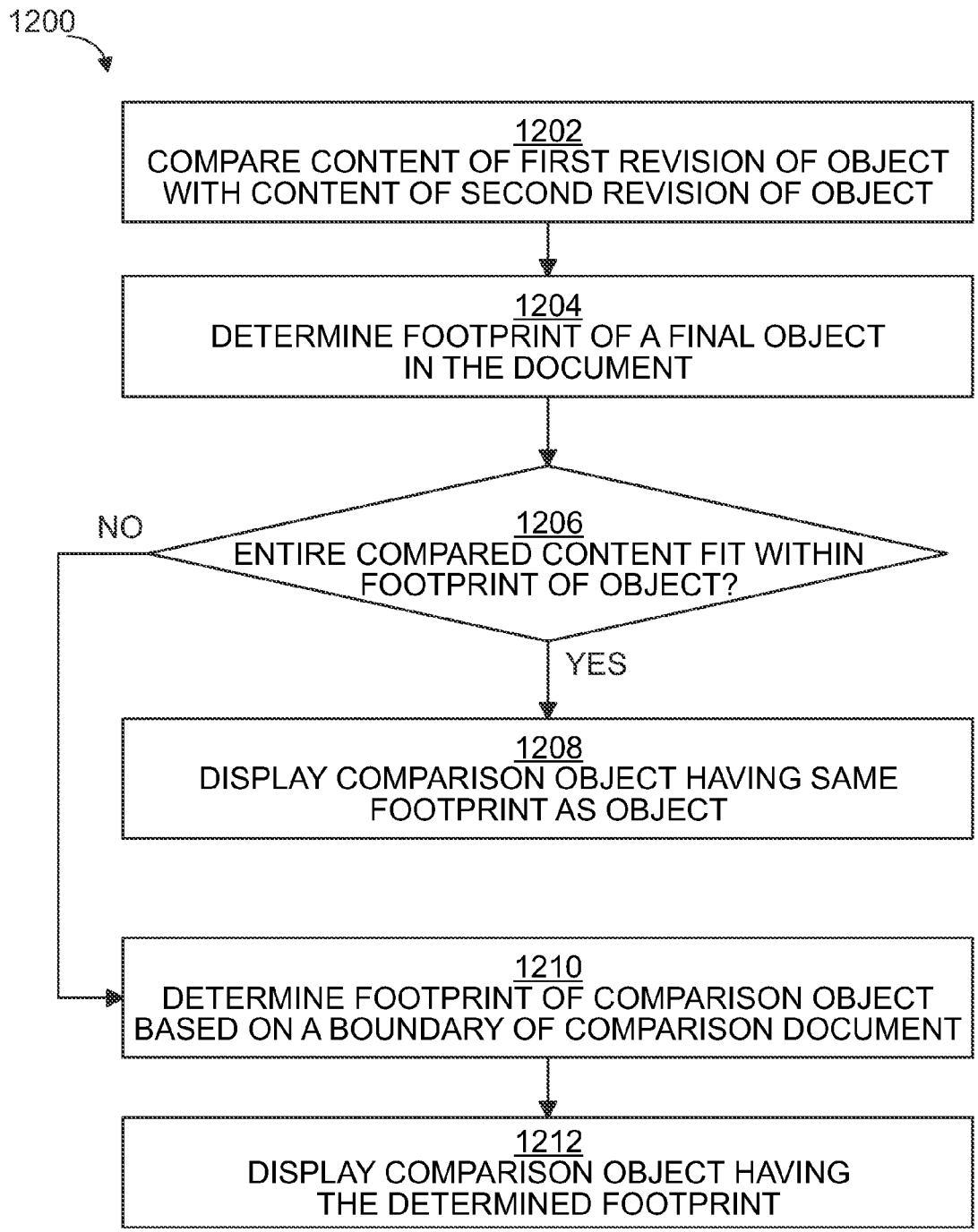
FIG. 12A is a flowchart illustrating a method of displaying a comparison object based on a boundary of a page in a comparison document, according to an embodiment.

FIG. 12A is a flowchart illustrating a method of displaying a comparison object based on a boundary of a page of a comparison document, according to an embodiment. At step 1202, the document comparison system 10 compares content of a first revision of the object with content of a second revision of the object to produce a comparison object (e.g., table comparison object 412 as shown in FIG. 4) in a comparison document. At step 1204, the document comparison system 10 determines a footprint of the final object in the document (e.g., table object 212 as shown in FIG. 2). At step 1206, the document comparison system 10 determines whether the entire compared content (e.g., the entire compared contents of the table comparison object 412) fits within the footprint of the final object (e.g., table object 212). If the document comparison system 10 determines that the entire compared content fits within the footprint of the final object (YES of step 1206), the document comparison system 10 then displays the comparison object in the same footprint as the final object at step 1208. On the other hand, if the document comparison system 10 determines that the entire compared content does not fit within the footprint of the final object (NO of step 1206), the document comparison system 10 then determines a footprint of the comparison object based on a boundary of a page of the comparison document (e.g., the comparison slide shown in FIG. 4) at step 1210. The document comparison system 10 then displays the comparison object as having the determined footprint at step 1212.

Figure 12B:
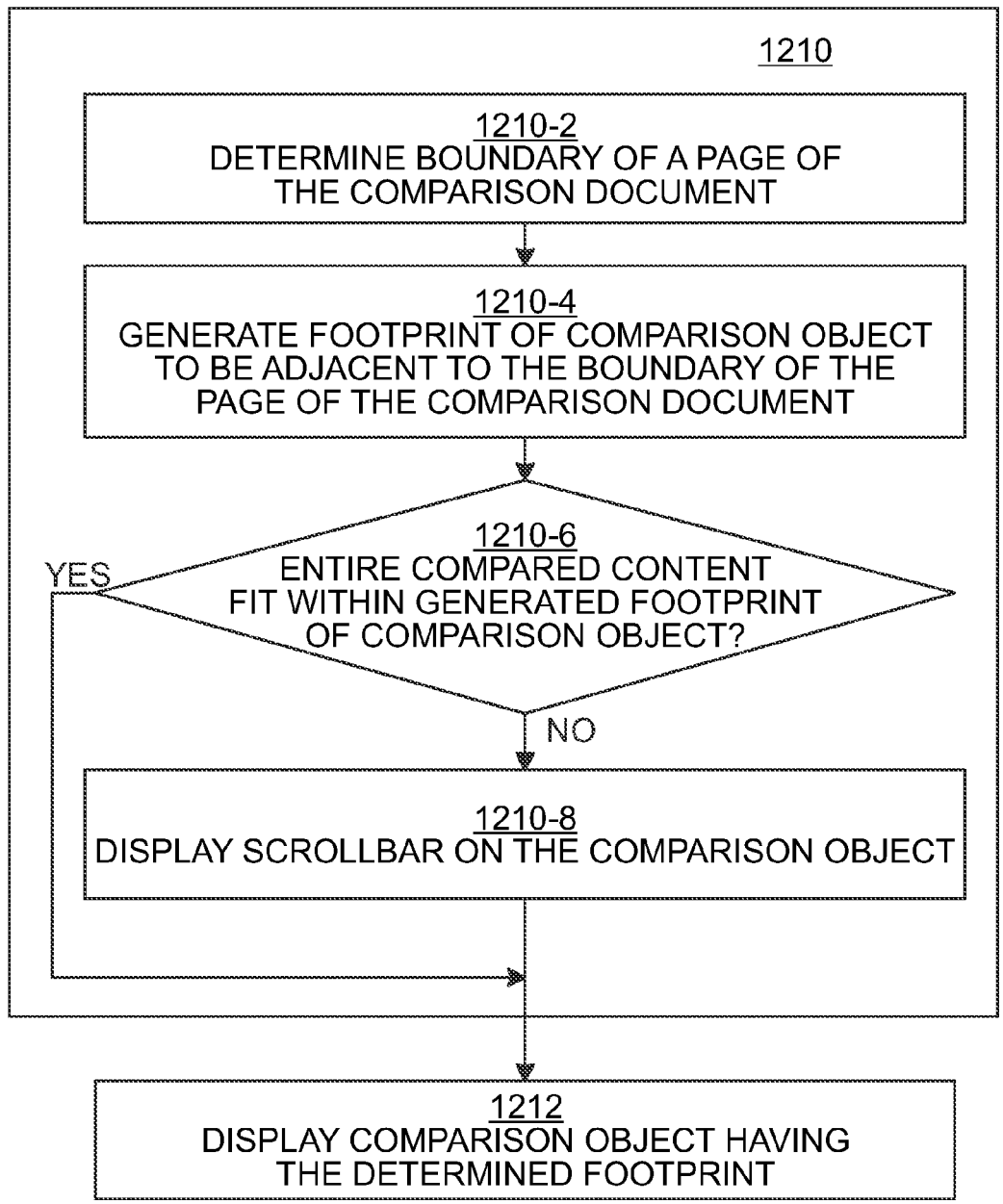
FIG. 12B is a flowchart illustrating a method of generating a footprint of a comparison object based on a boundary of a page of a comparison document, according to an embodiment.

FIG. 12B is a flowchart illustrating a method of generating a footprint of a comparison object based on a boundary of a page of comparison document (step 1210 of FIG. 12A), according to an embodiment. At step 1210-2, the document comparison system 10 determines a boundary of a page of the comparison document (e.g., bottom edge of the comparison slide). Based on the boundary of the page of the comparison document, the document comparison system 10 generates the footprint of the comparison object to be adjacent to the boundary of the page at step 1210-4. Then at step 1210-6, the document comparison system 10 determines whether the entire compared content fits within the generated footprint of the comparison object. If the entire compared content fits within the generated footprint of the comparison object (YES of step 1210-6), the document comparison system 10 then displays the comparison object as having the generated footprint in step 1212. If the entire compared content does not fit within the generate footprint (NO of step 1210-6), then at step 1210-8, the document system 10 generates a scroll bar to be displayed with the comparison object. The document system 10 then displays the comparison object as having the generated footprint and the scroll bar in step 1212. Moreover, in the embodiments shown in FIGS. 12A and 12B, the generated footprint of the comparison object may partially or completely overlap the other comparison objects in the comparison document.

In various other embodiments, the document comparison system 10 may generate the comparison document in PDF format. To preserve the original layout of a document, a final version of a section or slide is first displayed in the PDF comparison document, and the comparison objects are displayed separately following the final version of the section or slide. The PDF comparison document may be generated by a static document comparison viewer, or as a function or feature of an interactive document comparison viewer.

Figure 13A:
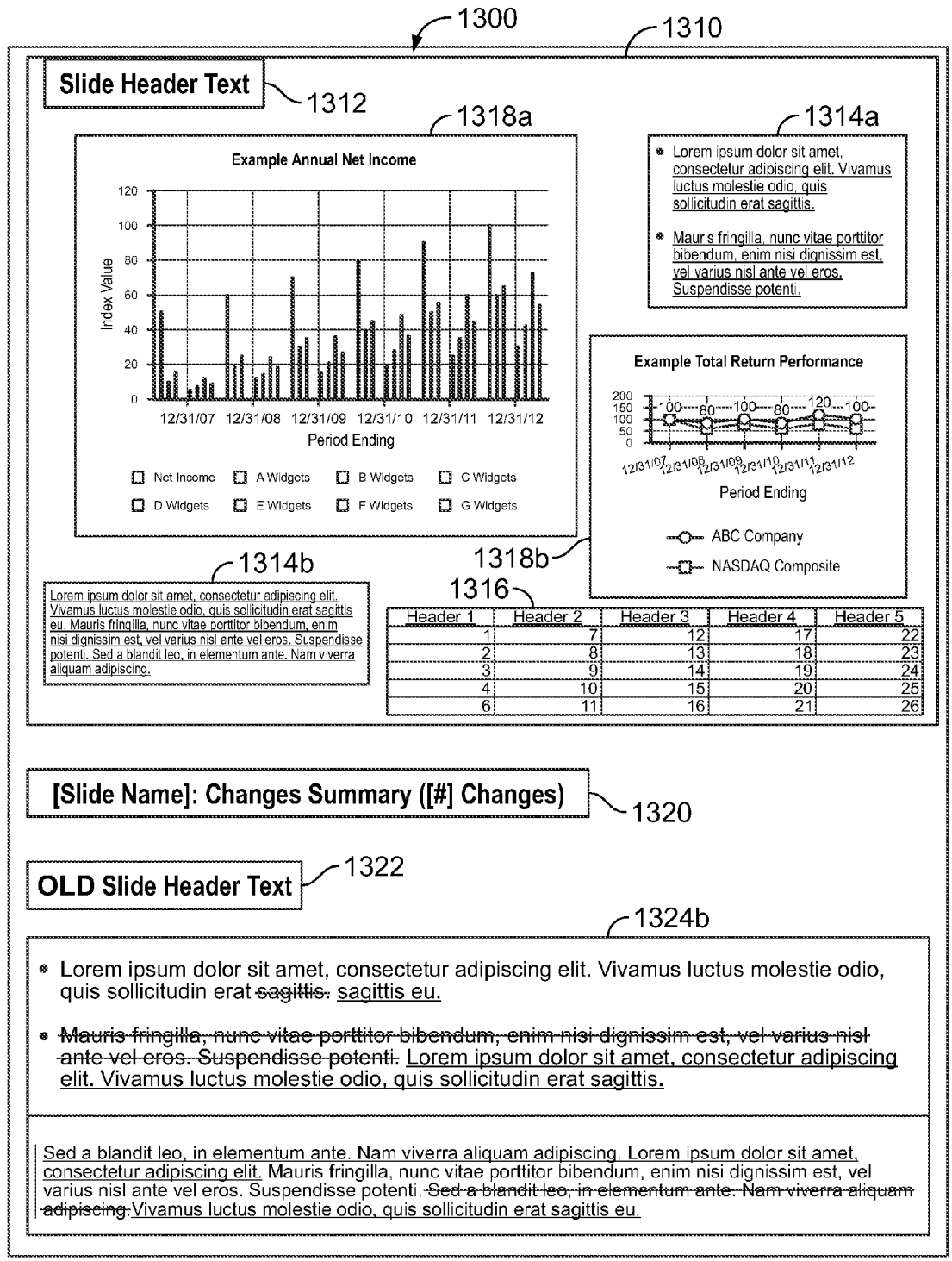

FIGS. 13A-13D are diagrams illustrating a PDF document display of a comparison document, according to an embodiment. The PDF document display includes four pages 1300 to 1303. In FIG. 13A, on the first PDF comparison document page 1300, a final slide 1310 is displayed at a top portion of the first PDF document page 1300. The final slide 1310 includes a slide header 1312, a first text object 1314*a*, a second text object 1314*b*, a table object 1316, a first graph object 1318*a*, and a second graph object 1318*b*.

At about the middle portion of the first PDF document page 1300, a comparison summary 1320 is displayed. The comparison summary 1320 may include the slide name or title and the number of changes in the slide. Below the comparison summary 1320, a comparison slide header 1322 is displayed, which shows the mark-ups to the slide header 1312. Below the comparison slide header 1322, a second text comparison object 1324*b* is displayed, showing the changes to the second text object 1314*b*. Because there is no change to the first text object 1314*a*, no first text comparison object is displayed.

Figure 13C:
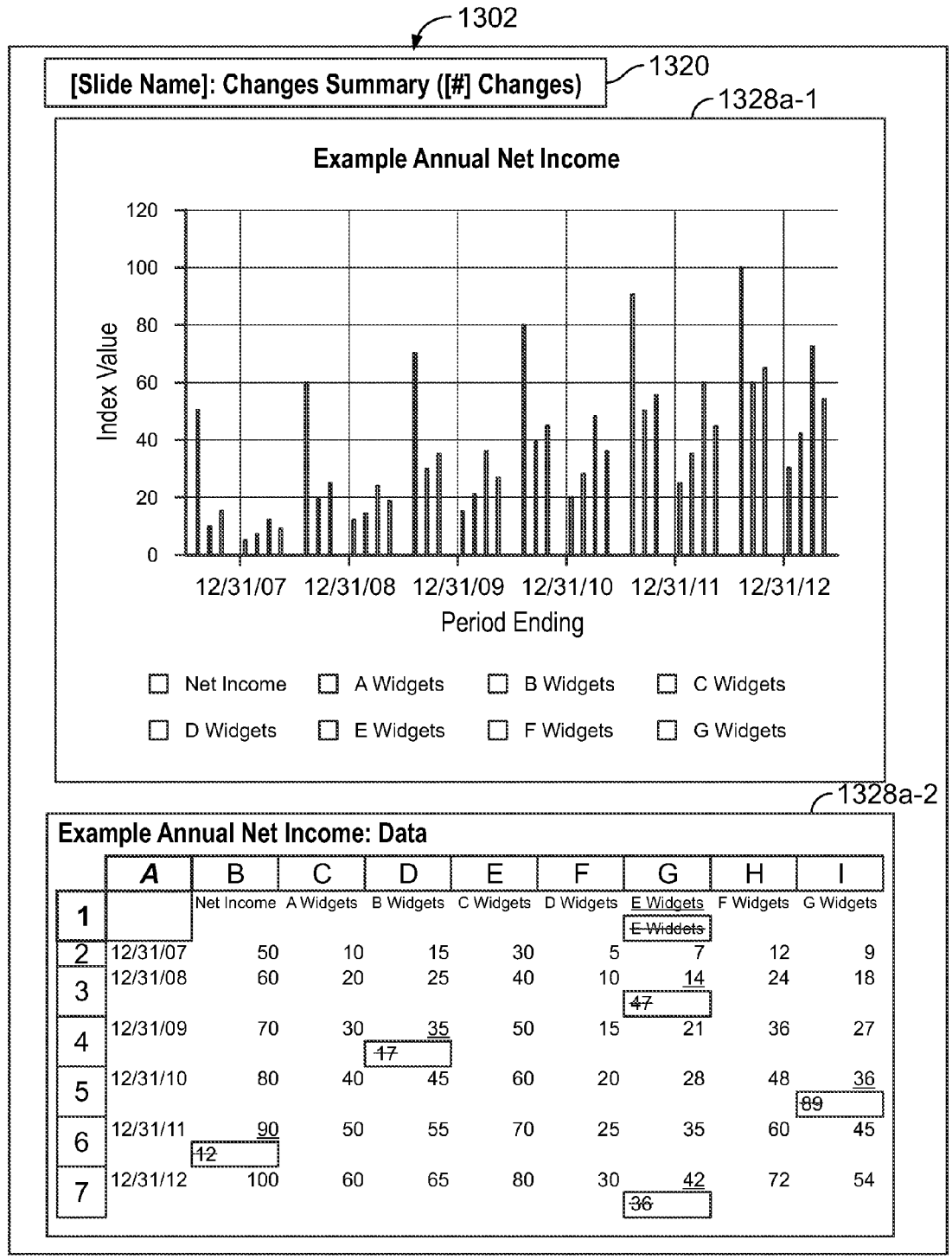
Figure 13D:
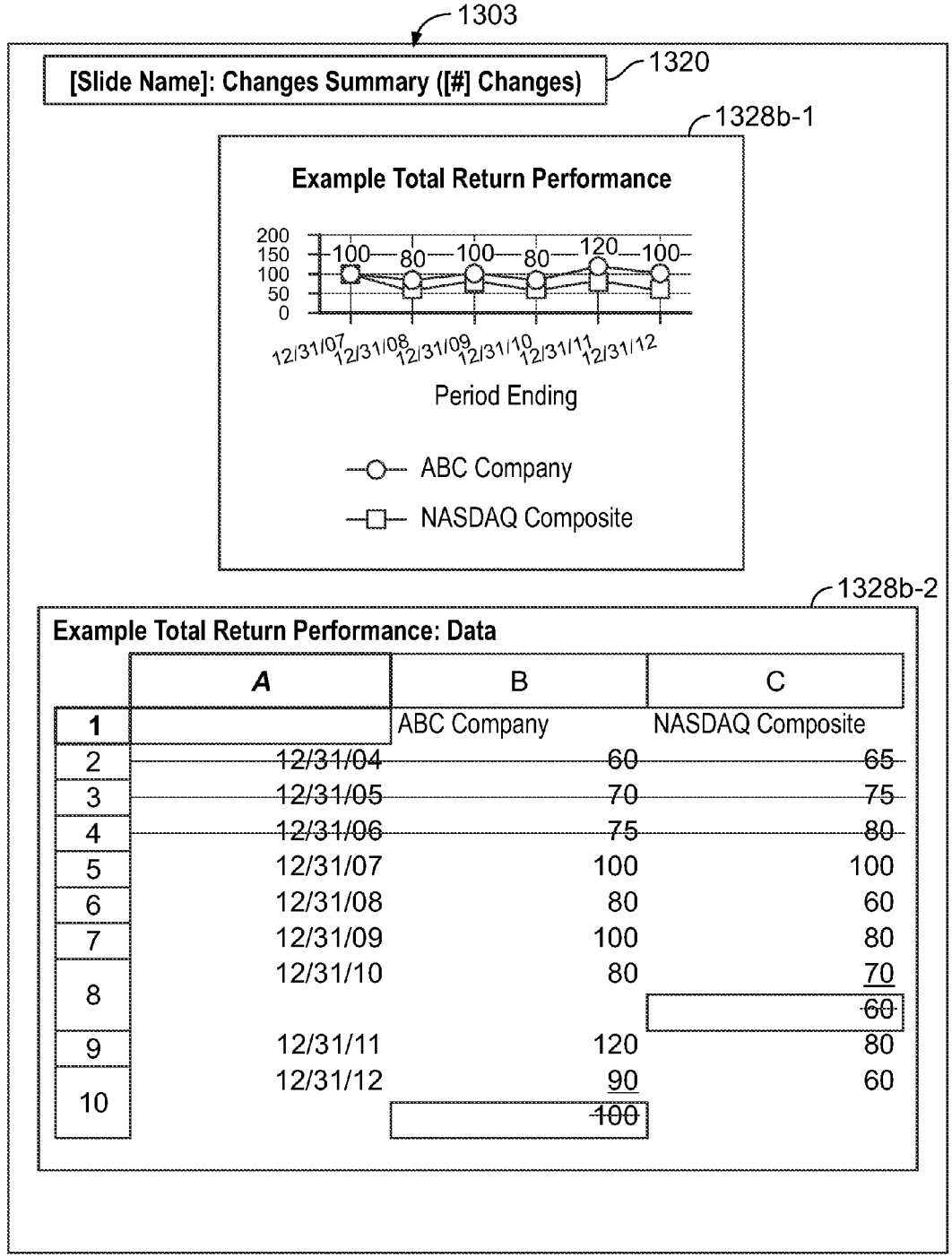

FIG. 13B illustrates the second PDF comparison document page 1301, in which the comparison summary 1320 and a table comparison object 1326 are displayed. FIG. 13C illustrates the third PDF comparison document page 1302, in which the comparison summary 1320, a first graph comparison object 1328*a*-1, and a first graph data comparison object 1328*a*-2 are displayed. FIG. 13D illustrates the fourth PDF comparison document page 1303, in which the comparison summary 1320, a second graph comparison object 1328*b*-1, and a second graph data comparison object 1328*b*-2 are displayed.

As shown in FIGS. 13C and 13D, when a graph object is compared, the data underlying the graph object are also compared. Moreover, comparing and displaying the changes to the data underlying the graph object more user friendly, since changes in a graph might be subtle and might be easily missed by a user. Accordingly, the first and second graph data comparison objects 1328*a*-2 and 1328*b*-2 facilitate the user's review of the changes in the first and second graph comparison objects 1328*a*-1 and 1328*b*-1.

In other embodiment, the document comparison system 10 may annotate objects in the PDF comparison document. The objects may be annotated numerically, alphabetically. The document comparison system 10 may otherwise annotate text, table, chart, image and other objects to display the mark-ups or changes in a list or other format. The annotation of the objects is used to draw a correlation between the objects as presented on the slide and the mark-ups or changes as represented either below the respective slide (e.g., footnote format as shown in FIGS. 13A-13D) or in an appendix. The appendix of the PDF comparison document may be generated in the case where the entire compared content of a comparison object cannot be displayed in the original footprint (i.e., the rendered comparison object would be cut off in the PDF view), and the entire compared content of the comparison object may be displayed in the appendix at the end of the PDF comparison document. Furthermore, the PDF comparison document may include a decomposed view, where comparison objects that exceed the footprint of the original objects and that collide with other comparison objects will have their own separate view from the slide.

In various embodiments, there may be a table of contents available to aid a user in navigation through the comparison document, arranged in either the appendix or footnote version of the PDF comparison document. In the appendix version, the annotation may have an embedded page number where the changes or mark-ups are displayed in relation to the rest of the comparison document.

In other embodiments, when the object contains underlying data that is linked to another object in the document or another document, the document comparison system may compare the underlying data and display (e.g., visually emphasize) the changes to the underlying data. The document comparison system may also display the data lineage, i.e., the element history of the data.

In yet other embodiments, the document comparison system offers a user the ability to interact with the comparison objects beyond standard scrolling, expanding, collapsing functionality. For instance, for charts, images, or other non-text objects that have multiple data point layers (e.g., chart label vs. chart table), a tabbed approach may be used for viewing the changes.

In another embodiment, comparison may be performed at the level of individual slides and is independent of slide order. For instance, if a slide is moved within a presentation, the content of the slide will still be effectively redline regardless of the change in the slide order.

Furthermore, the document comparison system may identify relationship between objects. The document comparison system may identify objects that can be grouped together, creating parent/child relationships between various objects, e.g., tables and associated footnotes. In turn, the association between the objects would be reflected in the object interactivity, e.g., expanding all comparison objects within a group simultaneously. Also, the document comparison system may display changes in object grouping. The document comparison system may compare and display changes based on the assignment or removal of comparison object pairings and/or groupings.

In still other embodiments, the document comparison system may allow the user to sequentially navigate through objects as displayed on a slide through a secondary carousel positioned near the slide, which offers quick access to the comparison objects. This would allow for users to see if there are objects that are occluded or overlapped during the normal interaction or display of other comparison objects. For instance, in a comparison document that includes numerous comparison objects and clean objects, the secondary carousel draws the user's attention to the comparison objects and allows a user to scroll through and view the comparison objects one at a time. The secondary carousel may be implemented as a popped-out view of the comparison object or may simply be an automatic highlight or selection of the comparison object.

In yet other embodiments, the document comparison system may compare various underlying, embedded data, labels, and other chart content, as well as chart image between the selected points in time of the comparison document.

In addition to comparing the content of the slides, the document comparison system may also compare and display changes to the presentation metadata, e.g., compare and display changes to slide ordering, additions, deletions, name changes, etc. This feature allows users to quickly understand the overarching changes to the structure of the presentation as a whole and how it may have changed between revisions.

Furthermore, the document comparison system may compare and display changes to the layout of a slide, specifically the relative positioning of all comparison objects. The changes may be shown in a PDF comparison document page or in the interactive viewer.

When a master slide is used in a presentation, the document comparison system may compare and display changes in the master slide. In general, slides may inherit a base level of formatting from a master slide. The document comparison system allows users to choose to redline the master slide, isolate the changes to the master slide comparison view, and not display the master slide comparison on subsequent slides. Optionally, the document comparison system may allow users to redline content inherited from a master slide, which would be displayed on every slide chosen by the user as inheriting the master slide layout.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

TABLE OF REFERENCE CHARACTERS

| Ref. Character | Element |
| --- | --- |
| 10 | Document Comparison System |
| 100 | Server |
| 102 | Server Processor |
| 104 | Server Memory |
| 110, 110' | First and Second Client Devices |
| 120, 120' | First and Second Communication Links |
| 200 | Document Comparison Viewer |
| 210 | Slide Display |
| 212 | Table Object |
| 114a, 114b, 114c | First, Second, and Third Text Objects |
| 220 | Navigation Bar |
| 222 | Document Revision Display Selector |
| 224 | Comparison Display Selector |
| 226 | Slide Selector |
| 312, 412, 512 | Table Comparison Object |
| 314a, 314b, 314c | First, Second, and Third Text Comparison Objects |
| 416 | Scroll bar |
| 600-1212 | Flowchart and Flowchart elements |
| 1300, 1301, 1302, | First, Second, Third, and Fourth PDF Document |
| 1313 | Comparison Pages |
| 1310 | Final Slide |
| 1312 | Slide Header |
| 1314a, 1314b | First and Second Text Objects |
| 1316 | Table Object |
| 1318a, 1318b | First and Second Graph Objects |
| 1320 | Comparison Slide Summary |
| 1322 | Comparison Slide Header |
| 1324b | Second Text Comparison Object |
| 1326 | Table Comparison Object |
| 1328a-1, 1328b-1 | First and Second Graph Comparison Objects |
| 1328a-2, 1328b-2 | First and Second Graph Data Comparison Objects. |

What is claimed is:

1. A method for comparing revisions of a document, comprising:
   comparing content of a first revision of an object with content of a second revision of the object to produce a comparison object in a comparison document;
   determining a footprint of the second revision of the object, wherein the footprint is a dimensional length and width of the object;
   determining whether the entire compared content fits completely within the footprint of the second revision of the object;

if the entire compared content is determined to fit completely within the footprint of the second revision of the object, displaying the comparison object having the same footprint as the second revision of the object; and if the entire compared content is determined to not fit completely within the footprint of the second revision of the object, expanding the footprint of the comparison object beyond the footprint of the second revision of the object.

2. The method of claim 1, wherein the expanding of the footprint of the comparison object comprises:
determining a footprint of the comparison object to fit the entire compared content; and
displaying the comparison object having the determined footprint.

3. The method of claim 1, wherein the method further comprises:
displaying the comparison object having the expanded footprint.

4. The method of claim 1, wherein the expanding of the footprint of the comparison object comprises:
determining a footprint of the comparison object based on at least one other object in the comparison document; and
displaying the comparison object having the determined footprint.

5. The method of claim 4, wherein the determining of the footprint of the comparison object comprises:
determining a boundary of the at least one other object in the comparison document; and
generating the footprint of the comparison object to be adjacent to the boundary of the at least one other object.

6. The method of claim 5, further comprising:
determining whether the entire compared content fits within the generated footprint of the comparison object; and
if the entire compared content is determined to not fit within the generated footprint of the comparison object, displaying a scroll bar on the comparison object.

7. The method of claim 1, wherein the expanding of the footprint of the comparison object comprises:
determining a footprint of the comparison object based on a boundary of the comparison document; and
displaying the comparison object having the determined footprint.

8. The method of claim 7, wherein the determining of the footprint of the comparison object comprises:
determining a boundary of the comparison document; and
generating the footprint of the comparison object to be adjacent to the boundary of the comparison document.

9. The method of claim 8, further comprising:
determining whether the entire compared content fits within the generated footprint of the comparison object; and
if the entire compared content is determined to not fit within the generated footprint of the comparison object, displaying a scroll bar on the comparison object.

10. A method for displaying a comparison of revisions of a table, the method comprising:
comparing content of a first revision of a table with content of a second revision of the table to produce a table comparison object;
displaying the table comparison object on a screen with the same footprint as the second revision of the table, wherein the footprint is a dimensional length and width of the table;
receiving a user selection of the table comparison object; and
in response to the user selection, expanding the footprint of the table comparison object beyond the footprint of the second revision of the table.

11. The method of claim 10, wherein expanding the footprint of the table comparison object comprises expanding the table comparison object lengthwise, widthwise, or both.

12. The method of claim 10, wherein the table is on a page, and expanding the footprint of the table comparison object comprises expanding the footprint of the table comparison object beyond the boundary of the page.

13. The method of claim 10, wherein expanding the footprint of the table comparison object comprises expanding the footprint of the table comparison object to overlap other objects on the screen.

14. The method of claim 10, wherein the table is on a slide, and expanding the footprint of the table comparison object comprises rendering the table comparison object as an independent, non-connected object from the rest of the slide.

15. A system comprising a display unit, wherein the system executes an application to perform steps comprising:
comparing content of a first revision of an object with content of a second revision of the object to produce a comparison object in a comparison document;
determining a footprint of the second revision of the object, wherein the footprint is a dimensional length and width of the object;
determining whether the entire compared content fits completely within the footprint of the second revision of the object;
if the entire compared content is determined to fit completely within the footprint of the second revision of the object, displaying the comparison object having the same footprint as the second revision of the object on the display unit; and
if the entire compared content is determined to not fit completely within the footprint of the second revision of the object, expanding the footprint of the comparison object beyond the footprint of the second revision of the object.

16. The system of claim 15, wherein the expanding of the footprint of the comparison object comprises:
determining a footprint of the comparison object to fit the entire compared content; and
displaying the comparison object having the determined footprint.

17. The system of claim 15, wherein the method further comprises:
displaying the comparison object having the expanded Footprint.

18. The system of claim 17, wherein the expanding of the footprint of the comparison object comprises:
determining a footprint of the comparison object based on at least one other object in the comparison document; and
displaying the comparison object having the determined footprint.

19. The system of claim 18, wherein the determining of the footprint of the comparison object comprises:
determining a boundary of the at least one other object in the comparison document; and
generating the footprint of the comparison object to be adjacent to the boundary of the at least one other object.

20. The system of claim 19, further comprising:
  determining whether the entire compared content fits within the generated footprint of the comparison object; and
  if the entire compared content is determined to not fit within the generated footprint of the comparison object, displaying a scroll bar on the comparison object.

* * * * *